(12) United States Patent
Hong et al.

(10) Patent No.: US 11,900,168 B2
(45) Date of Patent: Feb. 13, 2024

(54) ELECTRONIC DEVICE SUPPORTING VIRTUAL MOBILE ENVIRONMENT ENABLING USER TO SELECT COMPUTING RESOURCES AND PERFORMING APPLICATION WITH SELECTED COMPUTING RESOURCES

(71) Applicant: Samsung Electronics Co., Ltd., Gyeonggi-do (KR)

(72) Inventors: Jungkih Hong, Gyeonggi-do (KR); Minseok Kim, Gyeonggi-do (KR); Wonsuk Lee, Gyeonggi-do (KR); Kiyoung Lim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 375 days.

(21) Appl. No.: 17/293,324

(22) PCT Filed: Jul. 23, 2019

(86) PCT No.: PCT/KR2019/009105
§ 371 (c)(1),
(2) Date: May 12, 2021

(87) PCT Pub. No.: WO2020/101142
PCT Pub. Date: May 22, 2020

(65) Prior Publication Data
US 2022/0012099 A1    Jan. 13, 2022

(30) Foreign Application Priority Data
Nov. 16, 2018    (KR) .................. 10-2018-0141954

(51) Int. Cl.
*G06F 9/50*    (2006.01)
*H04M 1/72469*    (2021.01)
*H04M 1/725*    (2021.01)

(52) U.S. Cl.
CPC .......... *G06F 9/5044* (2013.01); *G06F 9/5055* (2013.01); *H04M 1/725* (2013.01); *H04M 1/72469* (2021.01)

(58) Field of Classification Search
CPC ................ G06F 9/5044; G06F 9/5055; H04M 1/72469; H04M 1/725
See application file for complete search history.

(56) References Cited

U.S. PATENT DOCUMENTS 6,922,816 B1    7/2005    Amin et al.
8,897,744 B2    11/2014    Raleigh
(Continued)

FOREIGN PATENT DOCUMENTS

KR    10-2011-0035546    4/2011
KR    10-2014-0108849    9/2014
(Continued)

OTHER PUBLICATIONS

Shengtao Yue, RepDroid: An Automated Tool for Android Application Repackaging Detection; 2017, IEEE, (Year: 2017).*
(Continued)

*Primary Examiner* — Dong U Kim
(74) *Attorney, Agent, or Firm* — The Farrell Law Firm, P.C.

(57) ABSTRACT

An electronic device according to various embodiments may comprise: a touch-responsive display; a wireless communication circuit configured to transmit/receive a radio signal; a processor operatively connected to the wireless communication circuit and the display; and a memory operatively connected to the processor. The memory may store instructions that, when executed, cause the processor to: transmit user information to a remote computing device outside the electronic device, by using the wireless communication circuit; receive service profiles that differently define the
(Continued)

type and/or performance of computing resources used when executing an application, and an application list based on the user information, from the remote computing device through the wireless communication circuit; request the user to select one of the service profiles; display the type and performance of computing resources defined by the selected service profile; produce a graphic user interface configured to display information regarding computing quality exhibited when each application on the application list is executed by using packaging of computing resources defined by the selected service profile; display the graphic user interface through the display; receive selection of a service profile from the user through the graphic user interface displayed on the display; and transmit information regarding the service profile selected through the graphic user interface to the remote computing device through the wireless communication circuit. Various other embodiments are also possible.

10 Claims, 15 Drawing Sheets

(56) References Cited

U.S. PATENT DOCUMENTS

| | | | | |
|---|---|---|---|---|
| 10,044,808 | B2* | 8/2018 | Yendluri | G06F 9/5072 |
| 2008/0126166 | A1 | 5/2008 | Takahashi et al. | |
| 2009/0215447 | A1* | 8/2009 | Catalano | H04W 48/18 |
| | | | | 455/432.1 |
| 2015/0280765 | A1* | 10/2015 | Lowery | H04B 1/3816 |
| | | | | 455/558 |
| 2016/0080932 | A1 | 3/2016 | Jin et al. | |
| 2016/0105540 | A1* | 4/2016 | Kwon | H04N 21/4312 |
| | | | | 715/744 |
| 2016/0162172 | A1* | 6/2016 | Rathod | G06F 3/0481 |
| | | | | 715/747 |
| 2016/0285493 | A1* | 9/2016 | Veneroso | H04L 67/306 |
| 2017/0357532 | A1* | 12/2017 | Miraftabzadeh | H04L 41/40 |
| 2018/0034688 | A1 | 2/2018 | Lee et al. | |
| 2018/0324251 | A1* | 11/2018 | Padmanabh | H04L 67/306 |
| 2019/0102436 | A1* | 4/2019 | Bishnoi | G06F 16/244 |
| 2019/0250891 | A1* | 8/2019 | Kumar | G06F 18/2411 |
| 2019/0266283 | A1* | 8/2019 | Shukla | G06N 20/00 |
| 2020/0099742 | A1* | 3/2020 | Puente Pestaña | H04L 67/1076 |
| 2020/0387299 | A1* | 12/2020 | Rathod | G06F 3/04842 |

FOREIGN PATENT DOCUMENTS

| | | |
|---|---|---|
| KR | 10-2016-0032603 | 3/2016 |
| KR | 10-1707552 | 2/2017 |

OTHER PUBLICATIONS

PCT/ISA/210 Search Report issued on PCT/KR2019/009105, dated Oct. 31, 2019, pp. 5.
PCT/ISA/237 Written Opinion issued on PCT/KR2019/009105, dated Oct. 31, 2019, pp. 5.
Korean Office Action dated May 19, 2023 issued in counterpart application No. 10-2018-0141954, 13 pages.
KR Decision on Patent dated Nov. 27, 2023 issued in counterpart application No. 10-2018-0141954, 4 pages.

* cited by examiner

ELECTRONIC DEVICE SUPPORTING VIRTUAL MOBILE ENVIRONMENT ENABLING USER TO SELECT COMPUTING RESOURCES AND PERFORMING APPLICATION WITH SELECTED COMPUTING RESOURCES

PRIORITY

This application is a National Phase Entry of PCT International Application No. PCT/KR2019/009105 which was filed on Jul. 23, 2019, and claims priority to Korean Patent Application No. 10-2018-0141954, which was filed on Nov. 16, 2018, the content of each of which is incorporated herein by reference.

TECHNICAL FIELD

Various embodiments of the disclosure relate to a virtual mobile environment in which a remote computing device executes an application and a user device outputs an execution result without a need to install the application.

BACKGROUND ART

An electronic device (e.g., a smart phone) may execute an application using equipped computing resources (e.g., a processor and a memory) and provide an execution result to a user.

DISCLOSURE OF INVENTION

Technical Problem

Computing resources for executing an application may be fixed in an electronic device, and thus the computing quality of the application that a user can experience with the electronic device may be limited. For example, the application may not be properly executed due to a lack of computing resources even if it is installed in the electronic device, so that it may fail to provide a corresponding service to the user. Therefore, a new user-centered paradigm is required in a device that executes the application.

On the other hand, the electronic device having a wireless communication circuit is capable of providing various network services to the user. However, the current network service is designed based on a price policy determined by a communication company or a service provider without considering the types and/or performances of computing resources required in executing the application or the level of computing quality required by the user. Therefore, in establishing a price policy, a new user-centered paradigm is needed.

Various embodiments of the disclosure can provide a virtual mobile environment in which a user device allows a user to select computing resources, a remote computing device executes an application with the selected computing resources, and the user device outputs an execution result.

Solution to Problem

An electronic device according to various embodiments includes a touch-sensitive display; a wireless communication circuit configured to transmit/receive a radio signal; a processor operatively connected to the wireless communication circuit and the display; and a memory operatively connected to the processor. The memory may store instructions that, when executed, cause the processor to transmit user information to a remote computing device outside the electronic device by using the wireless communication circuit, to receive service profiles differently defining types and/or performances of computing resources used when executing an application, and an application list based on the user information, from the remote computing device through the wireless communication circuit, to generate a graphic user interface configured to allow a user to select one of the service profiles, display the types and performances of the computing resources defined in the selected service profile, and display information about a computing quality exhibited when each application in the application list is executed using packaging of the computing resources defined in the selected service profile, to display the graphic user interface through the display, to receive selection of a service profile from the user through the graphic user interface displayed on the display, and to transmit information about the service profile selected through the graphic user interface to the remote computing device through the wireless communication circuit.

An electronic device according to various embodiments includes a wired interface connected to a network; a plurality of processors operatively connected to the network through the wired interface; and a storage device operatively connected to the processors and storing at least one virtual device. The storage device may store instructions that, when executed, cause at least one of the processors to receive user information from a user device outside the electronic device through the wired interface, to generate an application list based on the user information, to transmit the application list and service profiles differently defining types and/or performances of computing resources used when executing an application to the user device through the wired interface, to receive information about a service profile selected from among the service profiles from the user device through the wired interface, to cause the virtual device to execute an application by using packaging of computing resources defined in the selected service profile, and to transmit a result of execution of the application to the user device through the wired interface.

Advantageous Effects of Invention

According to various embodiments of the disclosure, it is possible to provide, without limiting time and location, a user with services of various applications that are independent of computing resources fixed to electronic devices and require high-performance computing resources.

MODE FOR THE INVENTION

Figure 1:
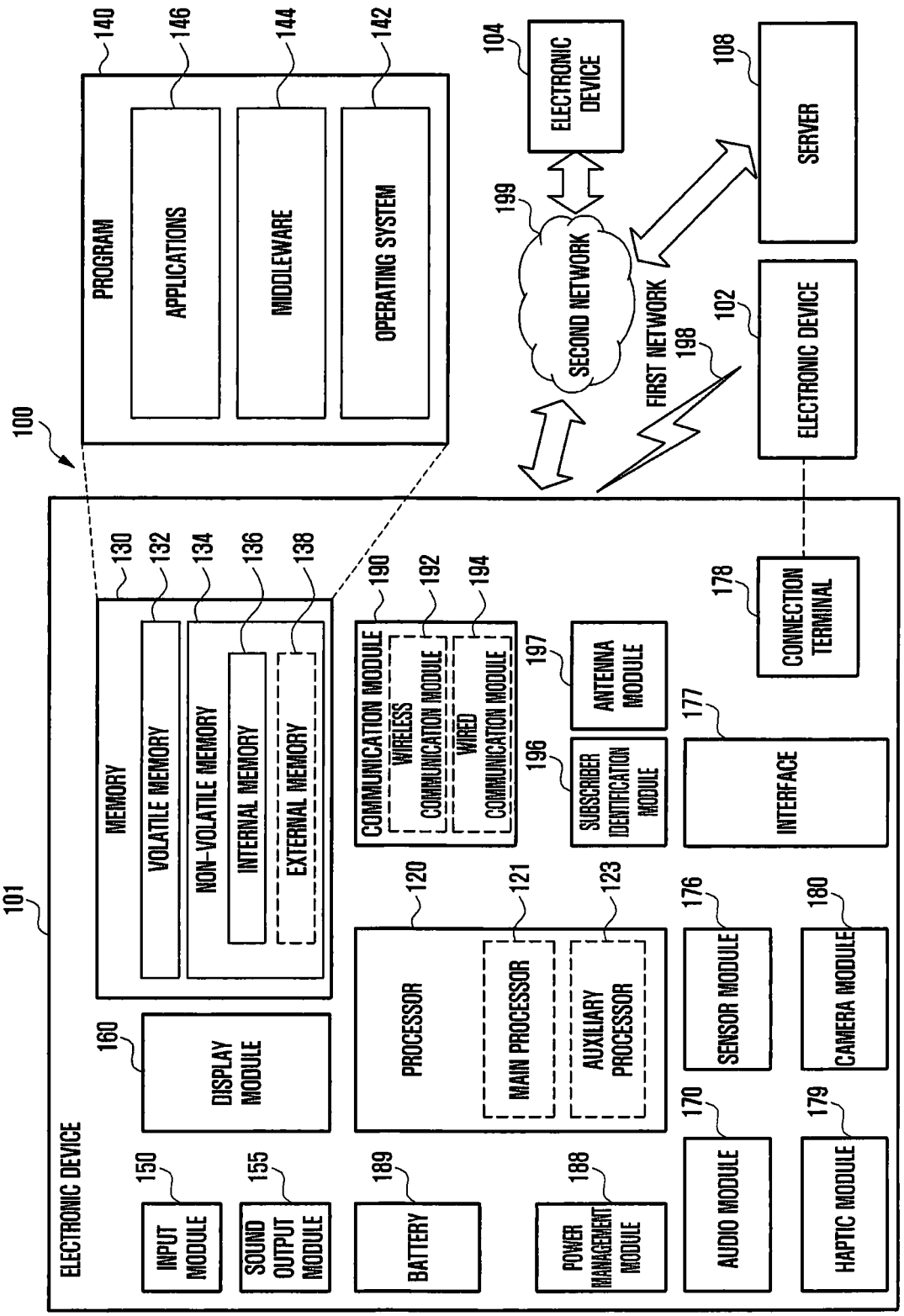
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
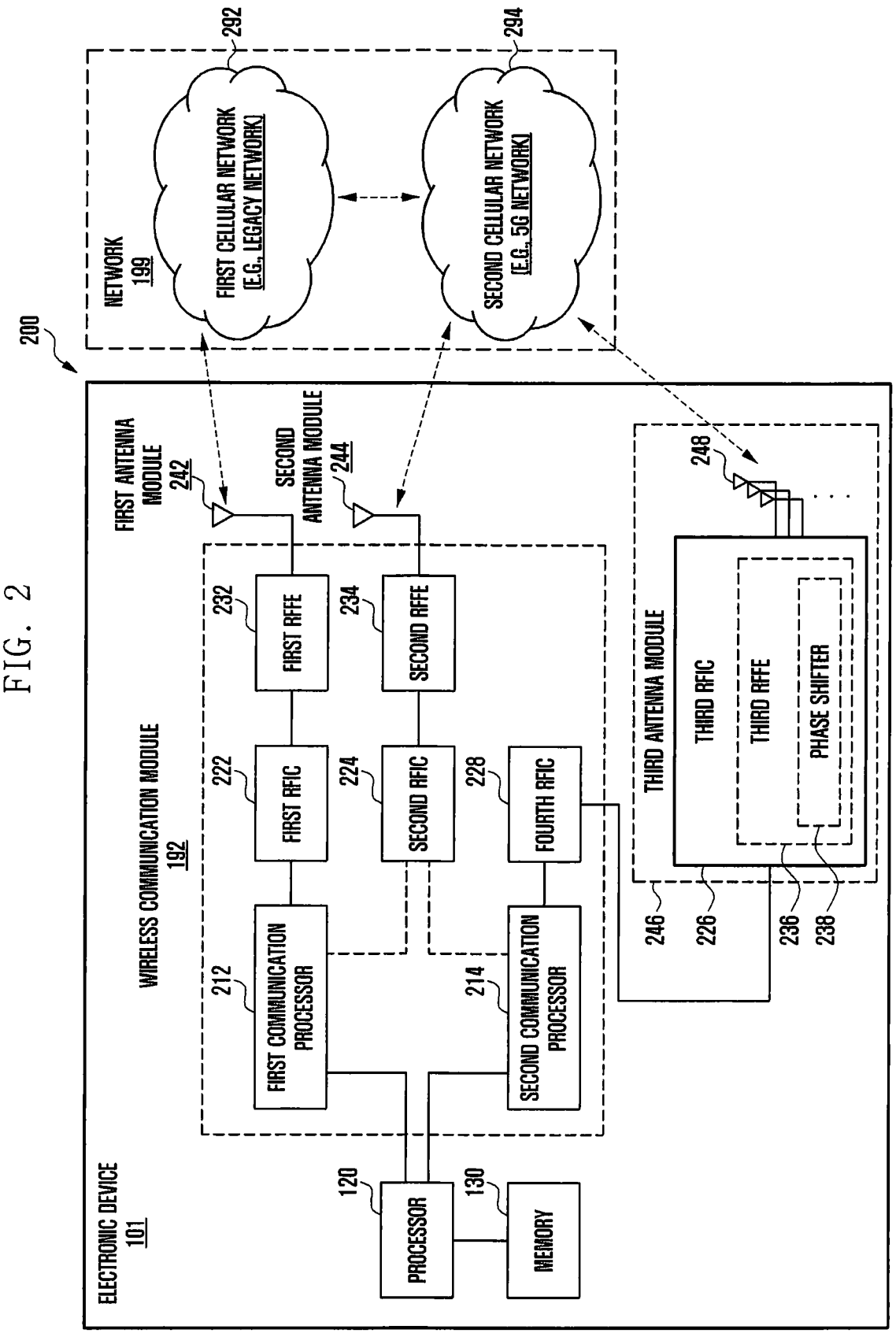
FIG. 2 is a block diagram illustrating an electronic device for supporting legacy network communication and 5G network communication according to various embodiments.

FIG. 2 is a block diagram 200 of an electronic device 101 for supporting legacy network communication and 5G network communication according to various embodiments. Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. The network 199 may include a first network 292 and a second network 294. According to another embodiment, the electronic device 101 may further include at least one component among the components illustrated in FIG. 1, and the network 199 may further include at least one different network. According to an embodiment, the first communication processor 212, the second communication processor 214, the first RFIC 222, the second RFIC 224, the fourth RFIC 228, the first RFFE 232, and the second RFFE 234 may form at least a part of the wireless communication module 192. According to another embodiment, the fourth RFIC 228 may be omitted or included as a part of the third RFIC 226.

The first communication processor 212 may support establishment of a communication channel in a band to be used for wireless communication with the first network 292, and legacy network communication through the established communication channel. According to various embodiments, the first network may be a legacy network including a 2G, 3G, 4G, or long term evolution (LTE) network. The second communication processor 214 may support establishment of a communication channel corresponding to a designated band (for example, about 6 GHz to about 60 GHz) among bands to be used for wireless communication with the second network 294, and 5G network communication through the established communication channel. According to various embodiments, the second network 294 may be a 5G network defined by third generation partnership project (3GPP). Additionally, according to an embodiment, the first communication processor 212 or the second communication processor 214 may support establishment of a communication channel corresponding to another designated band (for example, about 6 GHz or lower) among the bands to be used for wireless communication with the second network 294, and 5G network communication through the established communication channel. According to an embodiment, the first communication processor 212 and the second communication processor 214 may be implemented inside a single chip or a single package. According to various embodiments, the first communication processor 212 or the second communication processor 214 may be formed inside a single chip or a single package together with a processor 120, an auxiliary processor 123, or a communication module 190.

The first RFIC 222 may convert a baseband signal generated by the first communication processor 212 into a radio frequency (RF) signal at about 700 MHz to about 3 GHz, which is used for the first network 292 (for example, legacy network), during transmission. During reception, an RF signal may be acquired from the first network 292 (for example, legacy network) through an antenna (for example, the first antenna module 242), and may be preprocessed through an RFFE (for example, the first RFFE 232). The first RFIC 222 may convert the preprocessed RF signal into a baseband signal such that the same can be processed by the first communication processor 212.

The second RFIC 224 may convert a baseband signal generated by the first communication processor 212 or the second communication processor 214 into an RF signal in a Sub6 band (for example, about 6 GHz or lower) (hereinafter, referred to as a 5G Sub6 RF signal) that is used for the second network 294 (for example, 5G network). During reception, a 5G Sub6 RF signal may be acquired from the second network 294 (for example, 5G network) through an antenna (for example, the second antenna module 244), and may be preprocessed through an RFFE (for example, the second RFFE 234). The second RFIC 224 may convert the preprocessed 5G Sub6 RF signal into a baseband signal such that the same can be processed by a communication processor corresponding to the first communication processor 212 or the second communication processor 214.

The third RFIC 226 may convert a baseband signal generated by the second communication processor 214 into an RF signal in a 5G Above6 band (for example, about 6 GHz to about 60 GHz) (hereinafter, referred to as a 5G Above6 signal) that is to be used for the second network 294 (for example, 5G network). During reception, a 5G Above6 RF signal may be acquired from the second network 294 (for example, 5G network) through an antenna (for example, the antenna 248), and may be preprocessed through the third RFFE 236. The third RFIC 226 may convert the preprocessed 5G Above6 signal into a baseband signal such that the same can be processed by the second communication processor 214. According to an embodiment, the third RFFE 236 may be formed as a part of the third RFIC 226.

According to an embodiment, the electronic device 101 may include a fourth RFIC 228 separately from the third RFIC 226 or as at least a part thereof. In this case, the fourth RFIC 228 may convert a baseband signal generated by the second communication processor 214 into an RF signal in an intermediate frequency band (for example, about 9 GHz to about 11 GHz) (hereinafter, referred to as an IF signal) and then deliver the IF signal to the third RFIC 226. The third RFIC 226 may convert the IF signal into a 5G Above6 RF signal. During reception, a 5G Above6 RF signal may be received from the second network 294 (for example, 5G network) through an antenna (for example, antenna 248) and converted into an IF signal by the third RFIC 226. The fourth RFIC 228 may convert the IF signal into a baseband signal such that the same can be processed by the second communication processor 214.

According to an embodiment, the first RFIC 222 and the second RFIC 224 may be implemented as at least a part of a single chip or a single package. According to an embodiment, the first RFFE 232 and the second RFFE 234 may be implemented as at least a part of a single chip or a single package. According to an embodiment, at least one antenna module of the first antenna module 242 or the second antenna module 244 may be omitted or coupled to another antenna module so as to process RF signal in multiple corresponding bands.

According to an embodiment, the third RFIC 226 and the antenna 248 may be arranged on the same substrate so as to form a third antenna module 246. For example, the wireless communication module 192 or the processor 120 may be arranged on a first substrate (for example, main PCB). In this case, the third RFIC 226 may be formed on a partial area (for example, lower surface) of a second substrate (for example, sub PCB) that is separate from the first substrate, and the antenna 248 may be arranged in another partial area (for example, upper surface), thereby forming a third antenna module 246. The third RFIC 226 and the antenna 248 may be arranged on the same substrate such that the length of the transmission line between the same can be reduced. This may reduce loss (for example, attenuation) of a signal in a high-frequency band (for example, about 6 GHz to about 60 GHz) used for 5G network communication, for example, due to the transmission line. Accordingly, the electronic device 101 may improve the quality or speed of communication with the second network 294 (for example, 5G network).

According to an embodiment, the antenna 248 may be formed as an antenna array including multiple antenna elements that may be used for beamforming. In this case, the third RFIC 226 may include multiple phase shifters 238 corresponding to the multiple antenna elements, as a part of the third RFFE 236, for example. During transmission, each of the multiple phase shifters 238 may shift the phase of a 5G Above6 RF signal, which is to be transmitted to the outside (for example, base station of 5G network) of the electronic device 101, through a corresponding antenna element. During reception, each of the multiple phase shifters 238 may shift the phase of a 5G Above6 RF signal received from the outside into the same or substantially same phase through a corresponding antenna element. This enables transmission or reception through beamforming between the electronic device 101 and the outside.

The second network 294 (for example, 5G network) may be operated independently of the first network 292 (for example, legacy network) (for example, standalone (SA)), or operated while being connected thereto (for example, non-standalone (NSA)). For example, the 5G network may include only an access network (for example, 5G radio access network (RAN) or next-generation network (NG RAN)) and include no core network (for example, next-generation core (NGC)). In this case, the electronic device 101 may access the access network of the 5G network and then access an external network (for example, Internet) under the control of the core network (for example, evolved packed core (EPC)) of the legacy network. Protocol information (for example, LTE protocol network) for communication with the legacy network or protocol information (for example, new radio (NR) protocol information) for communication with the 5G network may be stored in the memory 230, and may be accessed by another component (for example, the processor 120, the first communication processor 212, or the second communication processor 214).

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
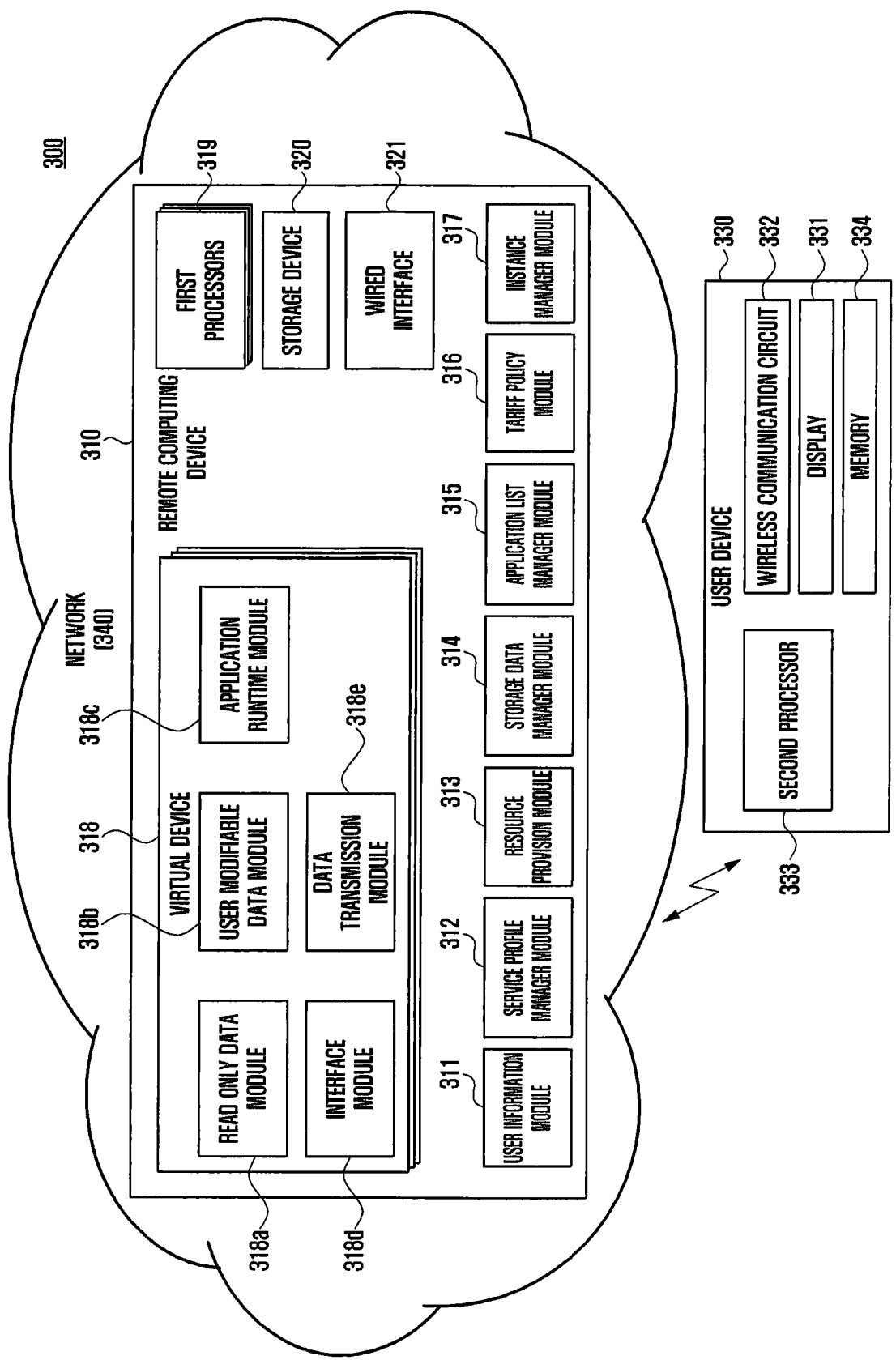
FIG. 3 illustrates a network environment according to various embodiments of the disclosure, the network environment providing a profile setting interface to a user to select a computing resource, executing an application with the selected computing resource, and providing a result of the execution to the user.

FIG. 3 illustrates a network environment 300 according to various embodiments of the disclosure, the network environment providing a profile setting interface to a user to select a computing resource, executing an application with the selected computing resource, and providing a result of the execution to the user. Referring to FIG. 3, the network environment 300 may include a remote computing device 310, a user device 330, and a network 340. The remote computing device 310 may communicate with the user device 330 through the network 340 and provide a virtual mobile infrastructure to the user device 330, based on a request of the user device 330. According to an embodiment, the user device 330 (e.g., the electronic device 101 in FIG. 1) may receive various service profiles from the remote computing device 310 through the network 340, and receive a selection of a service profile from a user through a graphic user interface (hereinafter, a profile setting interface) for setting a service profile. The user device 330 may transmit information about the selected service profile to the remote computing device 310 through the network 340. The remote computing device 310 may execute a virtual device, based on the selected service profile. For example, the virtual device may include software (e.g., virtual device instance (VDI)) that is executed by at least one processor included in the remote computing device 310. The remote computing device 310 may cause the virtual device to execute an application by using a computing resource defined in the selected service profile. The remote computing device 310 may transmit (e.g., streaming) the result of execution (e.g., audio and/or video) to the user device 330 through the network 340. The user device 330 may provide the received result to the user through an output device (e.g., a display and/or a speaker). Alternatively, the user device 330 may additionally process (e.g., decode) the received result and provide it to the user through the output device. The remote computing device 310 may be, for example, a cloud server located in a core network of the network 340 (e.g., the core network of the first network 292 or the second network 294 in FIG. 2). In another example, the remote computing device 310 may be a cloud server (e.g., a mobile edge computing (MEC) server) located in an access network of the network 340 (e.g., the access network of the first network 292 or the second network 294 in FIG. 2). For example, the MEC server may be located adjacent to an edge (e.g., a base station (e.g., eNodeB, radio network controller (RNC))) of the network 340.

In various embodiments, the computing resource may include a hardware resource used when an electronic device (e.g., the virtual device of the remote computing device 310) executes an application. For example, the hardware resource may include at least one processor (e.g., AP, CPU, and/or GPU) or storage (e.g., a volatile memory into which commands and/or data are loaded, or a nonvolatile memory for storing results the virtual device processes and obtains). The virtual device may execute an application by using the hardware resource allocated thereto. The computing resource may include a network resource used when communicating between the network 340 and the user device 330. For example, the network resource may include the type of network (e.g., 3G, 4G, LTE, or 5G), the amount of data that the user device 330 can upload and/or download (e.g., 5G 40 GB+unlimited 4G, or unlimited 5G), or network quality of service (QoS) (e.g., data transfer rate (e.g., frame per second (FPS)), bandwidth, or latency). Using the network resource corresponding to the selected service profile, the remote computing device 310 may control the network 340 (e.g., request the network 340) to transmit the result executed by the virtual device to the user device 330.

In various embodiments, the service profile may include information indicating the type and/or performances of computer resources available when selected. The service profile may include information indicating the usage fee (e.g., monthly usage fee) of the corresponding computer resource. According to an embodiment, the remote computing device 310 may generate a plurality of service profiles differently indicating the types and/or performances of computer resources available when selected. For example, the higher the specifications of the available computer resources, the higher the usage fee may be.

According to various embodiments, the remote computing device 310 may receive user information (e.g., subscriber information stored in the subscriber identification module 196 in FIG. 1) from the user device 330 through the network 340. The remote computing device 310 may generate an application list based on the user information. According to an embodiment, based on the user information, the remote computing device 310 may insert, into the application list, information indicating an application having been used by the user, or information indicating an application having been installed in the user device 330 (or another user device of the user). For example, the information indicating an application may include a name, an image, or a category for identifying of the application. In addition, the information indicating an application may include, for example, a rating, a review, or the number of downloads showing the reactions of users to the application.

According to an embodiment, the remote computing device 310 may select at least one of applications with a usage history and/or installation history based on information related to preference (e.g., usage time and/or usage frequency), and insert information indicating the selected application(s) into the application list.

According to an embodiment, the remote computing device 310 may insert information indicating a recommended application into the application list. For example, the recommended application may include applications that are within a predetermined ranking (e.g., 1st to 10th) in terms of popularity, sales, or newness. In another example, the recommended application may include an application in the ranking among applications having the same category (e.g., game, health, education, or finance) as the selected application based on a preference.

According to an embodiment, the remote computing device 310 may identify, based on the user information, a communication company and/or a service provider to which the user has subscribed, and insert information indicating an application matched with identified information (e.g., a dedicated application provided by the communication company and/or the service provider) into the application list.

According to an embodiment, the remote computing device 310 may insert information indicating an application promoted by a communication company and/or a service provider into the application list. For example, among the applications being promoted, the remote computing device 310 may select, as an application to be inserted into the application list, an application having the same category (e.g., game, health, education, or finance) as the selected application based on preference.

According to various embodiments, the remote computing device 310 may determine, for each application in the application list, a computing resource (e.g., hardware resource) required when being executed. Additionally, the remote computing device 310 may determine a computing resource (e.g., a network resource) required when transmitting a result of execution to the user device 330. For example, for each application, the remote computing device 310 may determine computing resources required by recommended specifications and computing resources required by optimum specifications, based on the statistically collected hardware service quality (e.g., runtime and/or network service quality (e.g., latency)).

According to an embodiment, the remote computing device 310 may cause the virtual device to execute an application with the selected computing resource and, based on statistical data for each application related to a data transfer rate (e.g., FPS) acquired at the time of execution, determine the recommended specifications and the optimum specifications required when executing the application. For example, the statistical data may include a latency as a representative index indicating the quality of service of a network resource. The latency may be defined as a time between a first time point when a data packet (e.g., a result of execution) is sent from a source (the remote computing device 310) and a second time point when the packet arrives at a destination (the user device 330). The source may recognize the second time point through a response (e.g., acknowledgment (ACK)) from the destination for the transmission of the packet. In another example, the latency may be defined by adding a time taken for a packet (e.g., the acknowledgment (ACK) of the destination for a packet sent from the source) to return from the destination to the source. Statistically a disconnection phenomenon sometimes occurs within a first latency, but when real-time playback is possible in the user device, the remote computing device 310 may determine a computing resource corresponding to the first latency as the recommended specifications. When statistically a video is played in real time without a disconnection phenomenon within a second latency (shorter than the first latency), the remote computing device 310 may determine a computing resource corresponding to the second latency as the optimum specifications. For each application, the remote computing device 310 may generate information indicating a computing resource of the recommended specifications (e.g., a recommended specification table) and information indicating a computing resource of the optimum specifications (e.g., an optimum specification table). The remote computing device 310 may transmit the service profiles, the application list, and the computing resource specification table (e.g., the recommended specification table and/or the optimum specification table for each application in the application list) to the user device 330 through the network 340.

According to an embodiment, the statistical data may further include a runtime as an index indicating the quality of service of hardware resources. Further based on the runtime, the remote computing device 310 may determine the recommended specifications and the optimum specifications required when executing a corresponding application.

According to various embodiments, the remote computing device 310 may classify applications described in the application list into, for example, three ranks (unsupported, supportable, and comfortable), based on the service profile selected by the user. For example, as in the above-described example, the remote computing device 310 may determine the recommended specifications and the optimum specifications for each application. If the computing resource corresponding to the selected service profile fails to meet the recommended specifications, the remote computing device 310 may classify the application as the "unsupported" rank. If the computing resource corresponding to the selected service profile meets the recommended specifications but does not meet the optimum specifications, the remote computing device 310 may classify the application as the "supportable" rank. If the computing resource corresponding to the selected service profile meets the optimum specifications, the remote computing device 310 may classify the application as the "comfortable" rank. The remote computing device 310 may transmit, to the user device 330 through the network 340, information about an operation level (e.g., the aforesaid three ranks) for each application determined based on the selected service profile.

According to various embodiments, the remote computing device 310 may include a user information module 311, a service profile manager module 312, a resource provision module 313, a storage data manager module 314, an application list manager module 315, a tariff policy module 316, an instance manager module 317, a plurality of virtual devices 318, a plurality of first processors 319, a storage device 320, and a wired interface 321 configured to connect wiredly the remote computing device 310 to the network 340.

According to various embodiments, the plurality of first processors 319 and the storage device 320 may be used as computing resources by the virtual devices 318. For example, the plurality of first processors 319 may be operatively connected to the above-mentioned modules 311 to 317 and the virtual devices 318. The storage device 320 may be operatively connected to the first processors 319. The storage device 320 may be configured to store instructions, including the modules 311 to 317 and the virtual devices 318, to be executed by at least one of the first processors 319, the applications to be executed by the virtual devices 318, and the results of execution.

According to various embodiments, the user information module 311 may store user's basic information (e.g., subscriber information received from the user device 330) in the storage device 320.

According to various embodiments, the service profile manager module 312 may manage the types and/or performances of available computing resources as the service profile (e.g., generate, change, or update the service profile), based on user information for each user (e.g., a subscribed communication company, a tariff plan in use (e.g., the type of network or the amount of data available)). The service profile manager module 312 may provide service profiles (e.g., a plurality of service profiles differently indicating the types and/or performances of available computer resources) to the user device 310 through the network 340, and receive information about the selected service profile from the user device 310 through the network 340. The service profile manager module 312 may perform tariff settlement for used computing resources.

According to various embodiments, the resource provision module 313 may control the execution of the virtual device, based on the selected service profile. According to an embodiment, the resource provision module 313 may identify the type and/or performances of computing resource defined in the selected service profile through the service profile manager module 312, and instruct the virtual device to execute an application by allocating the identified type of computing resource having the identified performance to one (e.g., a virtual device that is not running) of the virtual devices 318.

According to various embodiments, the storage data manager module 314 may manage data stored in the storage device 320. For example, the stored data may be data that the virtual device generates upon executing an application automatically or based on a user input received from the user device 330 through the network 340 and then stores in the storage device 320 (e.g., a nonvolatile memory). The stored data may be managed by the storage data manager module 314. For example, the storage data manager module 314 may store data transmitted to the user device 330 and delete it upon the elapse of a predetermined time. In another example, the storage data manager module 314 may identify the quota of the nonvolatile memory defined in the corresponding service profile. If the storage amount of the corresponding user data exceeds the quota, the storage data manager module 314 may delete a part of the stored data automatically or through user's confirmation (e.g., preferentially delete data stored first in time or delete data specified by the user).

According to various embodiments, the application list manager module 315 may generate and manage an application list to be provided to the user device 330, based on user information. Various methods described above may be used to generate the application list.

According to various embodiments, the tariff policy module 316 may determine a usage fee for the computing resource defined in the service profile. According to an embodiment, the service profile manager module 312 may package various computing resources as a unit of organization and define this as a service profile. The tariff policy module 316 may determine a usage fee for packaging and insert the determined usage fee into a corresponding service profile. According to an embodiment, the tariff policy module 316 may interwork with the service profile manager module 312 to change some components of the packaging upon a user request received from the user device 330 through the network 340. The tariff policy module 316 may change the usage fee for the changed packaging. For example, upon a user request, the service profile manager module 312 may change (e.g., add or delete) the type of computing resource or adjust the performances of the computing resource. The tariff policy module 316 may identify a change in packaging through the service profile manager module 312, re-determine a usage fee for the packaging, and insert the re-determined usage fee into the service profile.

According to various embodiments, the instance manager module 317 may store and manage information necessary for the operation of the virtual devices 318.

According to various embodiments, the virtual devices 318 may be allocated computing resources to execute an application. For example, a first virtual device may execute a first application by using a computing resource defined in a first service profile, and a second virtual device may execute a second application by using a computing resource defined in a second service profile.

According to an embodiment, the first service profile and the second service profile may be ones selected by the same user device to execute different applications. For example, the first service profile and the second service profile may be identical with each other, so that the first virtual device and the second virtual device may execute different applications by using the same computing resource. In another example, the first service profile and the second service profile may be different from each other, and thus the types and/or performances of computing resources allocated to the first virtual device and the second virtual device may be different. For example, the remote computing device 310 may differently allocate, to the second virtual device, at least one of the type of a processor, the number of processors, the quota of a volatile memory, the quota of a nonvolatile memory, or the bandwidth allocated to the first virtual device. Therefore, the virtual devices may exhibit different performances when executing different applications.

According to an embodiment, the first service profile and the second service profile may be selected by different user devices to execute the same (or different) application(s). For example, the first user device and the second user device may select the same (or different) service profile(s), so that the first virtual device and the second virtual device may execute the same (or different) application(s) by using the same (or different) computing resource(s) at the same time (or at different times).

According to various embodiments, the virtual devices 318 may include a read only data module 318a, a user modifiable data module 318b, an application runtime module 318c, an interface module 318d, and a data transmission module 318e. The read only data module 318a may store unchanged data that is stored when an application is installed, for example, commonly used data such as an execution program (or executable file) of an application, a unique resource file, and the like. The user modifiable data module 318b may store data that an application can change for each user. The application runtime module 318c may configure an environment in which an application operates, such as a Java virtual machine, a library, and/or system services. The interface module 318d may deliver a user input received through the network 340 to another component of the corresponding virtual device (e.g., the read only data module 318a). Then, the corresponding virtual device may execute a function and/or service of an application corresponding to the received user input by using the allocated computing resource. The data transmission module 318e (e.g., a frame buffer) may transmit the executed result to the user device 330 through the network 340.

According to various embodiments, the user device 330 may include a touch screen display 331 (e.g., the display device 160 in FIG. 1), at least one wireless communication circuit 332 (e.g., the communication module 190 in FIG. 1) configured to transmit and receive radio signals in accordance with the 3GPP standard, a second processor 333 (e.g., the processor 120 in FIG. 1) operatively connected to the display 331 and the wireless communication circuit 332, and a memory 334 (e.g., the memory 130 in FIG. 1) operatively connected to the second processor 333 and configured to store instructions to be executed by the second processor 333.

According to various embodiments, the second processor 333 may receive at least one service profile and related information (e.g., an application list and/or an optimum/recommended specification table) through the network 340 by using the wireless communication circuit 332.

According to various embodiments, the second processor 333 may select one of the received service profiles, based on a user input. Alternatively, the second processor 333 may randomly select a service profile or select a service profile designated as a default value from among the service profiles. The second processor 333 may display the selected service profile through the display 331. Alternatively, the second processor 333 may display an application list together with the selected service profile.

According to various embodiments, the second processor 333 may generate (e.g., rendering) computing quality information so that the user identifies the operation level of each application described in the application list, and may display the computing quality information through the display 331.

According to an embodiment, the second processor 333 may receive information about an application operation level (e.g., unsupported, supportable, or comfortable), determined based on the selected service profile, from the remote computing device 310 through the network 340, and display the operation level information of each application through the display 331 by visualizing it into a user-recognizable form. Through this visual information, the user can set the computing quality of the virtual mobile environment to the desired quality.

According to an embodiment, the second processor 333 may classify applications described in the list into, for example, three ranks (unsupported, supportable, and comfortable), based on the selected service profile and the recommended/optimum specification tables. For example, the second processor 333 may classify the application as the 'unsupported' rank if the computing resource defined in the service profile fails to meet the recommended specifications, as the 'supportable' rank if the computing resource meets the recommended specifications but does not meet the optimum specifications, and as the 'comfortable' rank if the computing resource meets the optimum specifications. The second processor 333 may visualize the operation level information of each classified application and display it through the display 331 so that the user can recognize it.

Figure 4A:
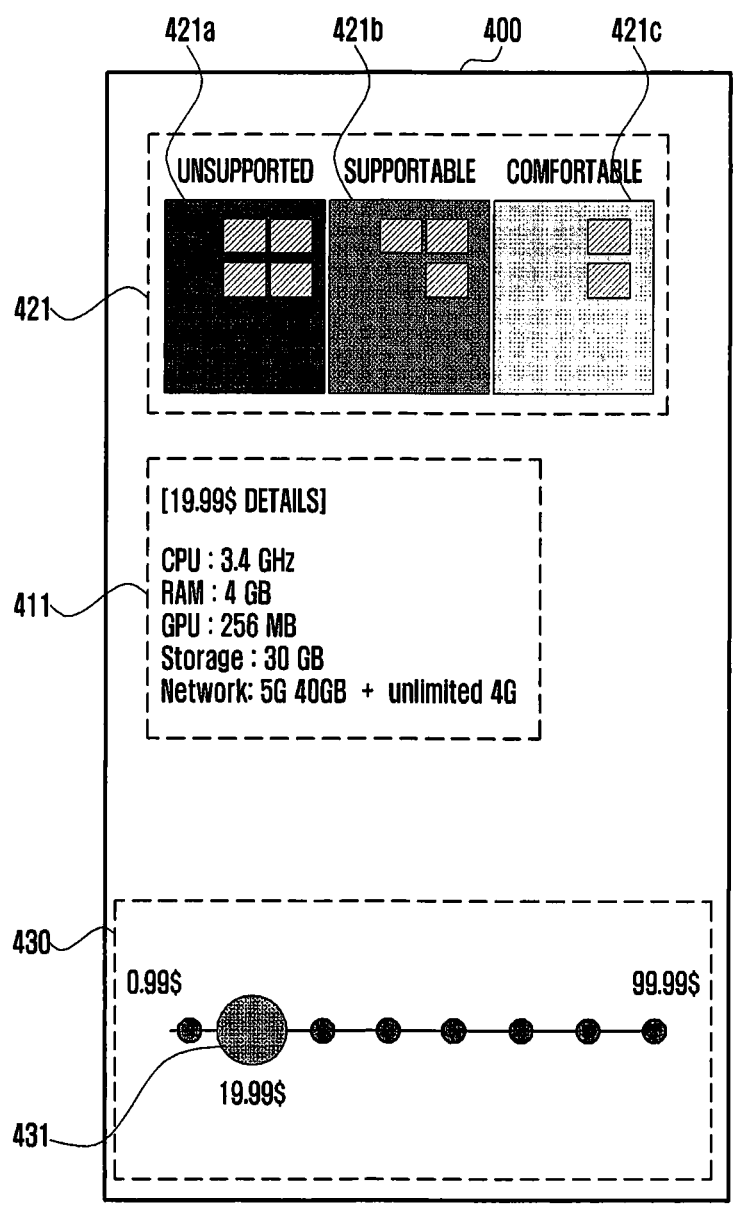
FIGS. 4A, 4B, and 4C illustrate a profile setting interface according to various embodiments of the disclosure, the profile setting interface allowing a user to select a service profile and showing each computing quality of applications corresponding to the selected service profile in a table format.
Figure 4B:
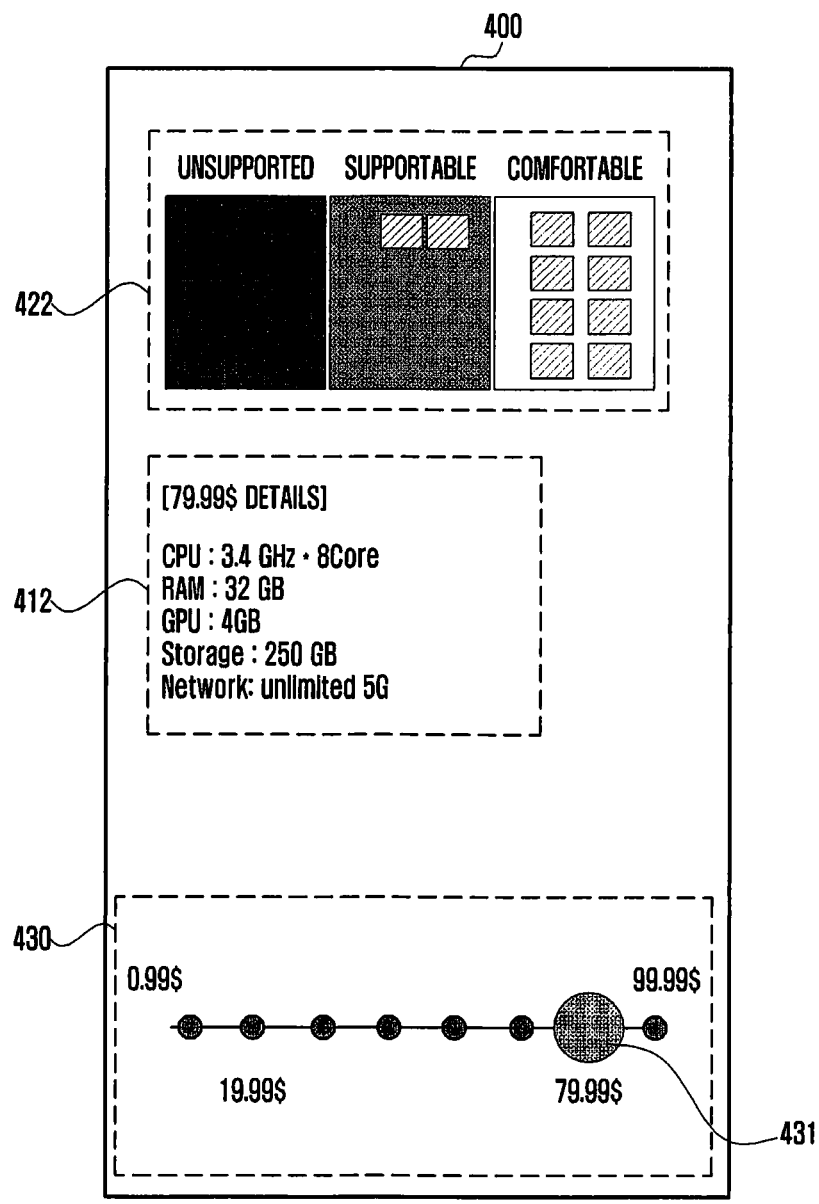
Figure 4C:
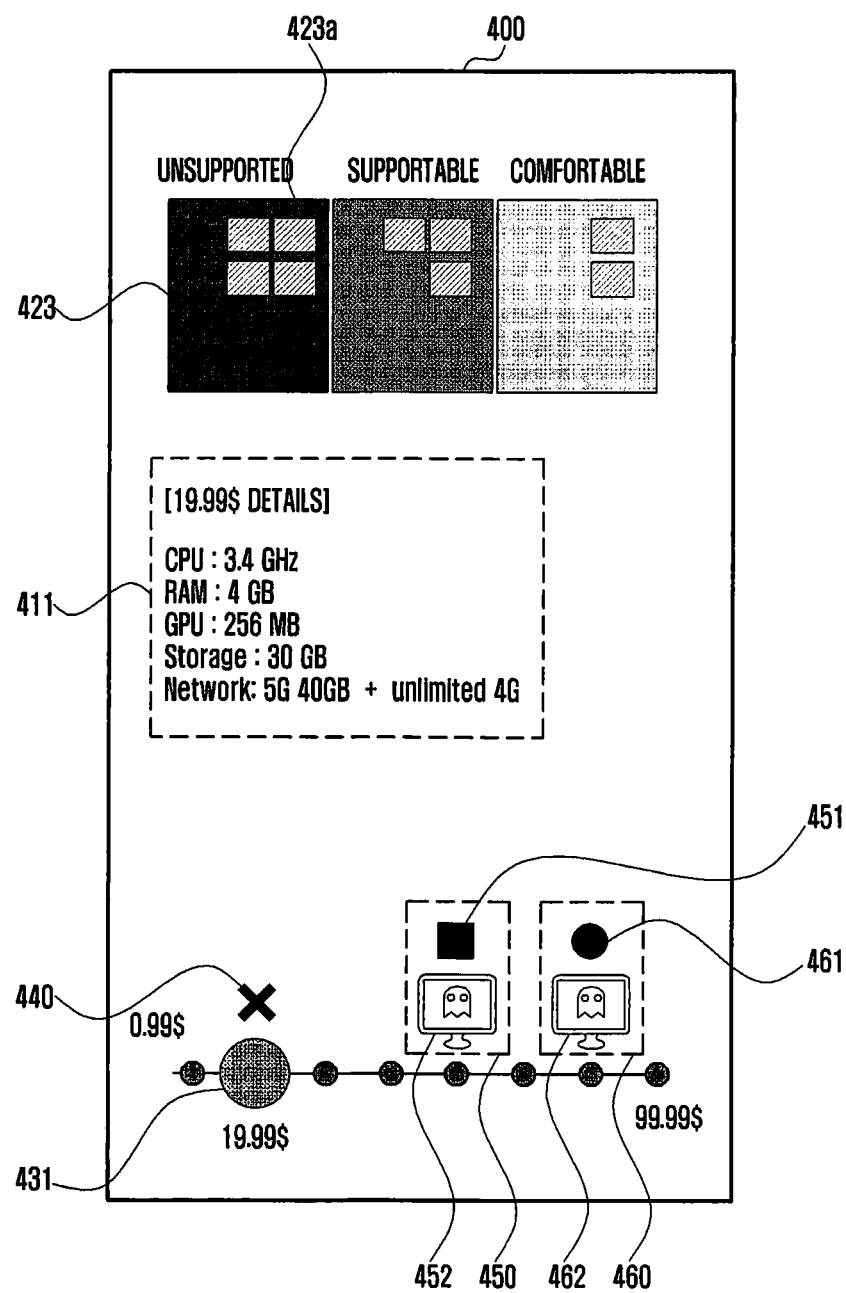

FIGS. 4A, 4B, and 4C illustrate a profile setting interface 400 according to various embodiments of the disclosure, the profile setting interface allowing a user to select a service profile and showing each computing quality of applications corresponding to the selected service profile in a table format.

Referring to FIG. 4A, a processor (e.g., the processor 120 in FIG. 1 or the second processor 333 in FIG. 3) according to various embodiments of the disclosure may display, on a display (e.g., the display device 160 in FIG. 1 or the display 331 in FIG. 3), the profile setting interface 400 including a first service profile 411, a first computing quality table 421, and a scroll bar 430 for changing a service profile. For example, the processor may insert the first service profile 411 including a packaging of available, upon selected, computing resources and a price set to the packaging into the profile setting interface 400, and display it on the display. As shown, it can be seen that the types of available computing resources are CPU, RAM, storage, and network type, that the performances of the computing resources are CPU operating speed (3.4 GHz), RAM capacity (4 GB), GPU memory capacity (256 MB), and the amount of data available in the network type (40 GB in 5G and unlimited in 4G), and that the price of this packaging is 19.99$.

The processor may determine the computing quality of each application exhibited when the virtual device of a remote computing device (e.g., the remote computing device 310 in FIG. 3) executes the application by using the packaging, based on the recommended/optimum specification tables received from the remote computing device. The processor may generate (e.g., rendering) the first computing quality table 421 based on the determined computing quality of each application, and insert the first computing quality table 421 into the profile setting interface 400 to display it on the display. For example, as shown, the first computing quality table 421 may contain a first table 421a showing applications corresponding to the unsupported rank, a second table 421b showing applications corresponding to the supportable rank, and a third table 421c showing applications corresponding to the comfortable rank.

The processor may insert the scroll bar 430 into the profile setting interface 400 and display it on the display. The scroll bar 430 shows a relative position of the first service profile 411 among a plurality of service profiles received from the remote computing device and allows changing the service profile. 400) and can be displayed on the display. The processor may determine the relative position of the first service profile 411, based on prices set for the respective service profiles, and may display the determined position on the scroll bar 430. For example, the processor may indicate the lowest price on the left side of the scroll bar 430 and the highest price on the right side. The processor may indicate points corresponding to the respective service profiles received from the remote computing device on the scroll bar 430, and indicate a selection button 431 at the point corresponding to the first service profile 411 displayed through the profile setting interface 400. Therefore, the user can easily estimate the number of service profiles (e.g., eight), the total price range (e.g., from 0.99 to 99.99$), and the relative price of the first service profile 411.

According to various embodiments, the processor (e.g., the processor 120 in FIG. 1 or the second processor 333 in FIG. 3) may change the service profile to be displayed through the profile setting interface 400, based on a user input, and may change the computing quality table in accordance with the changed service profile. For example, referring to FIG. 4B, the processor may move the selection button 431 to another point in response to a user input (e.g., a touch gesture). The second processor 333 may replace the first service profile 411 in the profile setting interface 400 with a second service profile 412 corresponding to the point where the selection button 431 is placed, and may display it on the display (e.g., the display device 160 in FIG. 1 or the display 331 in FIG. 3). The processor may determine the computing qualities of respective applications corresponding to the second service profile 412, based on the recommended/optimum specification tables. The processor may change the first computing quality table 421 to a second computing quality table 422 (e.g., render the second computing quality table 422), based on the determined computing qualities of the respective applications, and insert the second computing quality table 422 into the profile setting interface 400 to display it on the display. For example, packaging defined in the second service profile 412 may have higher performance than packaging defined in the first service profile 411. Therefore, through a comparison between the first computing quality table 421 and the second computing quality table 422, the user can see that the number of applications of unsupported rank has decreased, or that all applications have been changed to the supportable or comfortable rank as shown in FIG. 4B.

According to various embodiments, using a wireless communication circuit (e.g., the wireless communication module 192 in FIG. 1 or the wireless communication circuit 332 in FIG. 3), the processor (e.g., the processor 120 in FIG. 1 or the second processor 333 in FIG. 3) may transmit, to a remote computing device (e.g., the remote computing device 310 in FIG. 3), information indicating that the service profile has been changed. The remote computing device (e.g., the service profile manager module 312 in FIG. 3) may receive, from the processor through a wired interface (e.g., the wired interface 321 in FIG. 3), the information indicating that the service profile has been changed. The remote computing device (e.g., the resource provision module 313 in FIG. 3) may control the execution of the virtual device, based on the changed service profile.

According to various embodiments, the processor (e.g., the processor 120 in FIG. 1 or the second processor 333 in FIG. 3) may insert, into the profile setting interface 400, information that enables the user to know the packaging that meets the recommended specifications and/or optimum specifications for a specific application, and may display it on the display. For example, referring to FIG. 4C, the processor may receive a user's selection for a specific application (e.g., a user's touch input for an icon 423a of a specific application displayed in the table 423 indicating the unsupported rank) through the display. The processor may identify the recommended/optimum specifications of the selected application from a corresponding table received from the remote computing device (e.g., the remote computing device 310 in FIG. 3). The processor may determine a service profile that satisfies the identified recommended specifications among service profiles. The processor may determine a service profile that satisfies the identified optimum specifications among service profiles. The processor may insert first information 440, second information 450, and third information 460 into the profile setting interface 400 and display it on the display. The first information 440 indicates that the packaging of computing resources defined in the first service profile 411 fails to meet the recommended specifications of the selected application. The second information 450 allows the user to know a service profile that meets the recommended specifications. The third information 460 allows the user to know a service profile that meets the optimum specifications. For example, the processor may display the first information 440 in the shape of "X" denoting the unsupported rank at a position adjacent to the selection button 431. The processor may display the second information 450, containing a shape 451 denoting the supportable rank and an image 452 representing the selected application, at a position adjacent to the point indicating the corresponding service profile. The processor may display the third information 460, containing a shape 461 denoting the comfortable rank and an image 462 representing the selected application, at a position adjacent to the point indicating the corresponding service profile.

Figure 5A:
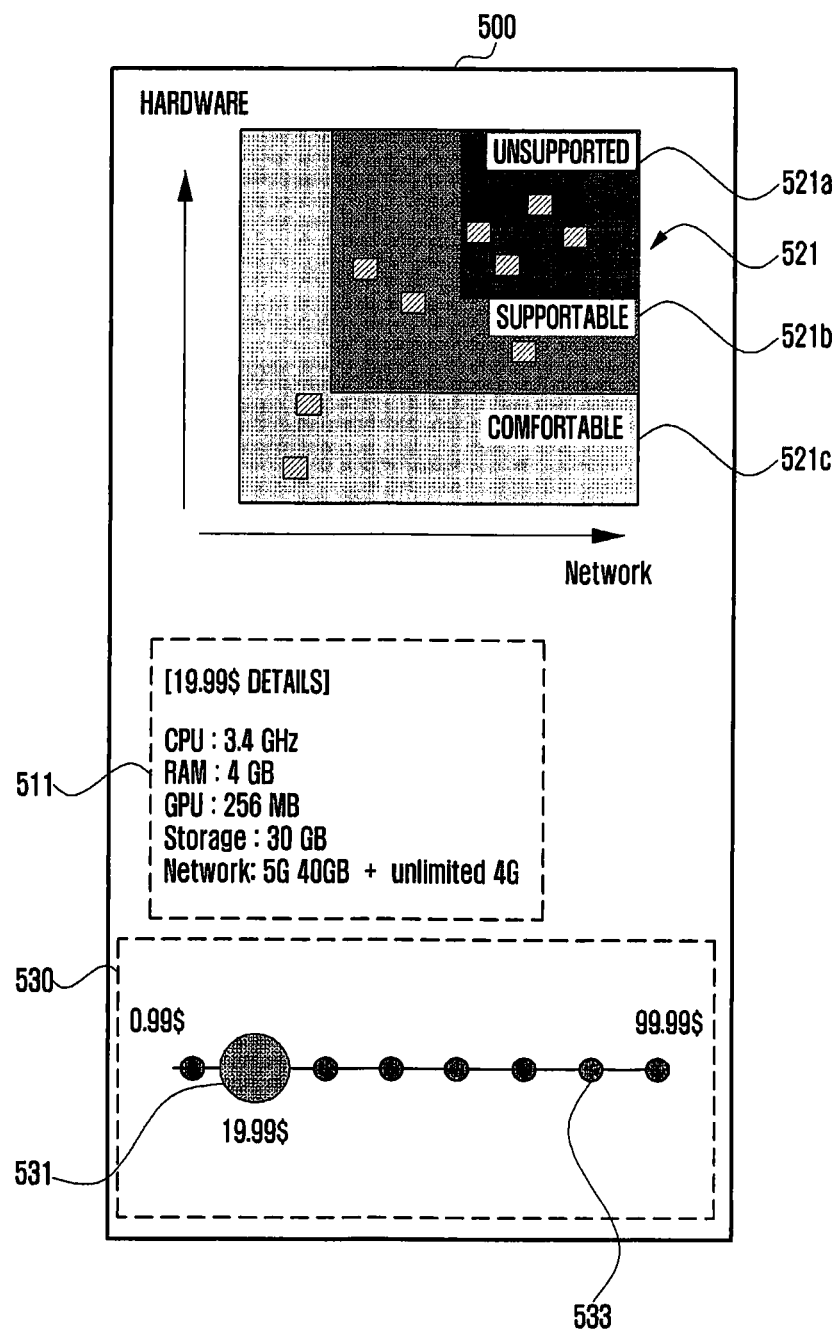
FIGS. 5A and 5B illustrate a profile setting interface according to various embodiments of the disclosure, the profile setting interface allowing a user to select a service profile and showing each computing quality of applications corresponding to the selected service profile in a table format.
Figure 5B:
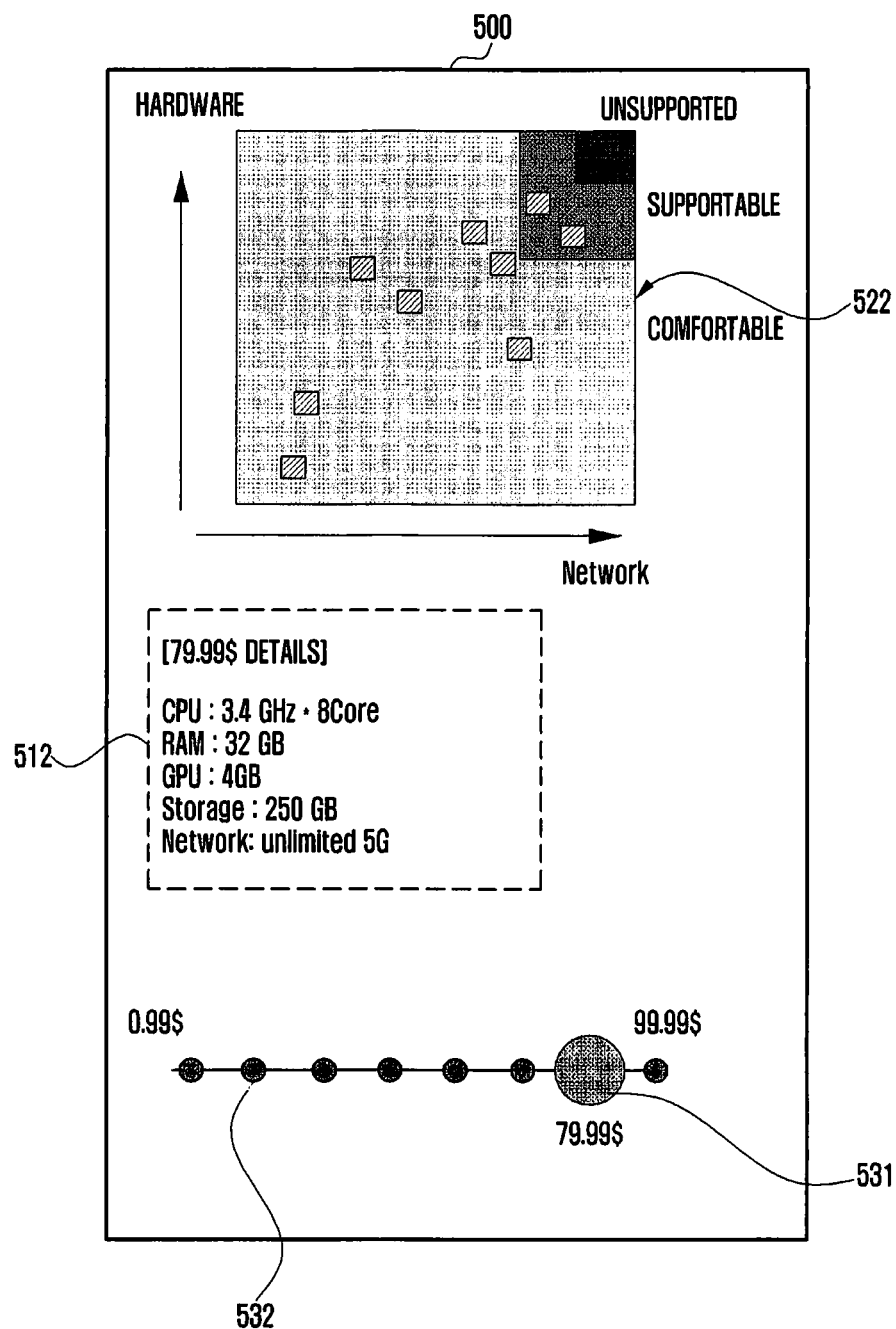

FIGS. 5A and 5B illustrate a profile setting interface 500 according to various embodiments of the disclosure, the profile setting interface allowing a user to select a service profile and showing each computing quality of applications corresponding to the selected service profile in a table format.

Referring to FIG. 5A, a processor (e.g., the processor 120 in FIG. 1 or the second processor 333 in FIG. 3) according to various embodiments of the disclosure may display, on a display (e.g., the display device 160 in FIG. 1 or the display 331 in FIG. 3), the profile setting interface 500 including a first service profile 511 (e.g., the first service profile 411 in FIG. 4A), a first computing quality graph 521, and a scroll bar 530 (e.g., the scroll bar 430 in FIG. 4A).

According to various embodiments, the processor (e.g., the processor 120 in FIG. 1 or the second processor 333 in FIG. 3) may determine the computing qualities of respective applications corresponding to the first service profile 511, based on the recommended/optimum specification tables received from the remote computing device 310. The processor may generate (e.g., render) the first computing quality graph 521, based on the determined computing qualities of the respective applications. The processor may insert the first computing quality graph 521 into the profile setting interface 500 and display it on a display (e.g., the display device 160 in FIG. 1 or the display 331 in FIG. 3). According to an embodiment, each axis of the first computing quality graph 521 may indicate one of types of computing resources. For example, the X-axis may indicate the network type, and the Y-axis may indicate the CPU operation speed. In the XY plane of the first computing quality graph 521, the first area 521a may contain an icon representing an application corresponding to an unsupported rank, the second area 521b may contain an icon representing an application corresponding to a supportable rank, and the third area 521c may contain an icon representing an application corresponding to the comfortable rank. The areas 521a, 521b, and 521c may be visually distinguished, and texts (e.g., unsupported, supportable, and comfortable) indicating such ranks may be displayed in the corresponding areas.

According to various embodiments, the processor (e.g., the processor 120 in FIG. 1 or the second processor 333 in FIG. 3) may change a service profile to be displayed through the profile setting interface 500, based on a user input. The processor may change the computing quality graph in accordance with the change in the service profile. For example, referring to FIG. 5B, the processor may move a selection button 531 from a first point 532 to a second point 533 in response to a user input (e.g., a touch gesture) to display it at the second point 533. The processor may replace the first service profile 511 in the profile setting interface 500 with a second service profile 512 corresponding to the second point 533 and display it on the display (e.g., the display device 160 in FIG. 1 or the display 331 in FIG. 3). The processor may determine the computing qualities of respective applications corresponding to the second service profile 512, based on the recommended/optimum specification tables. The processor may change the first computing quality graph 521 to a second computing quality graph 522 (e.g., render the second computing quality graph 522), based on the determined computing qualities of the respective applications, and insert the second computing quality graph 522 into the profile setting interface 500 to display it on the display. For example, packaging of computing resources defined in the second service profile 512 have higher performance than packaging of the computing resources defined in the first service profile 511. Therefore, through a comparison between the first computing quality graph 521 and the second computing quality graph 522, the user can see that the number of applications of unsupported rank has decreased, or that all applications have been changed to the supportable or comfortable rank as shown in FIG. 5B.

Figure 6A:
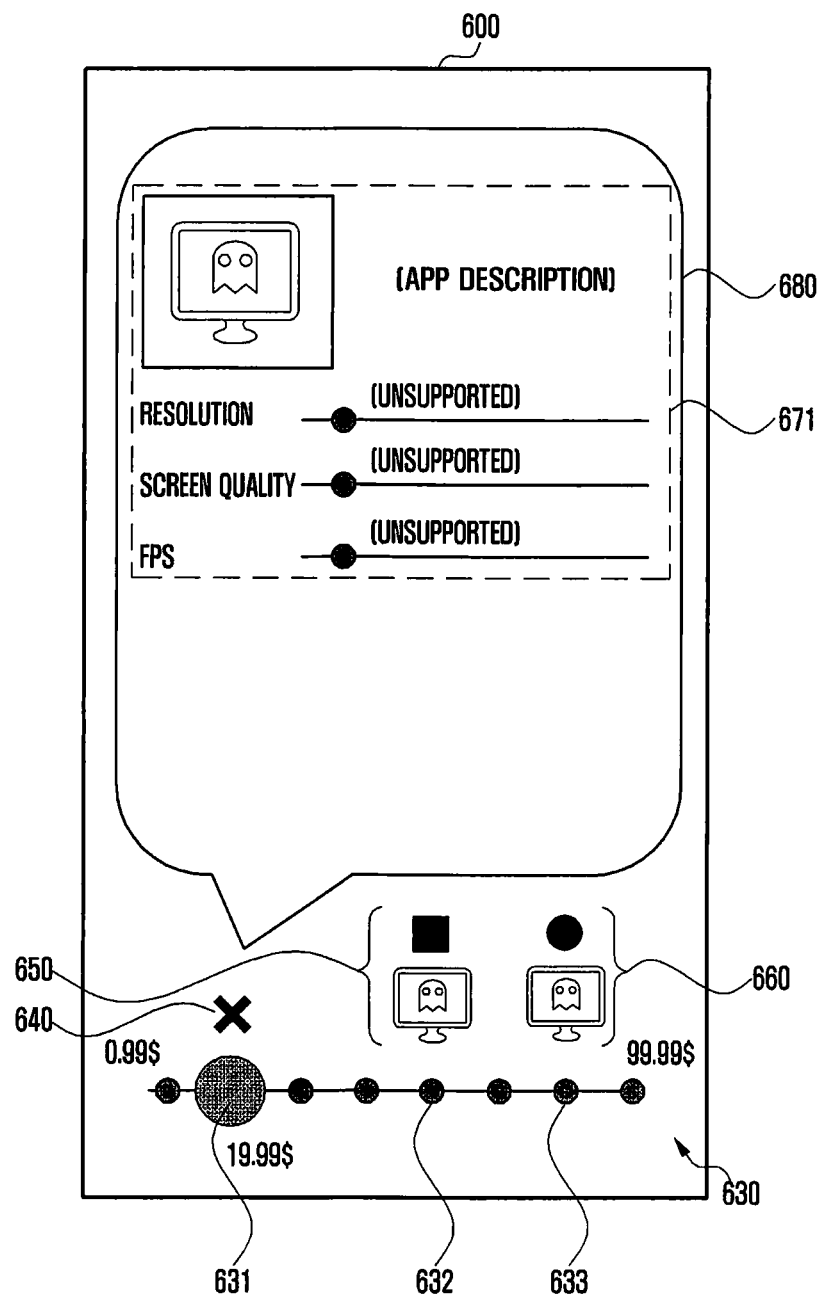
FIGS. 6A, 6B, and 6C illustrate a profile setting interface according to various embodiments of the disclosure, the profile setting interface showing the computing quality of a specific application corresponding to a selected service profile.
Figure 6B:
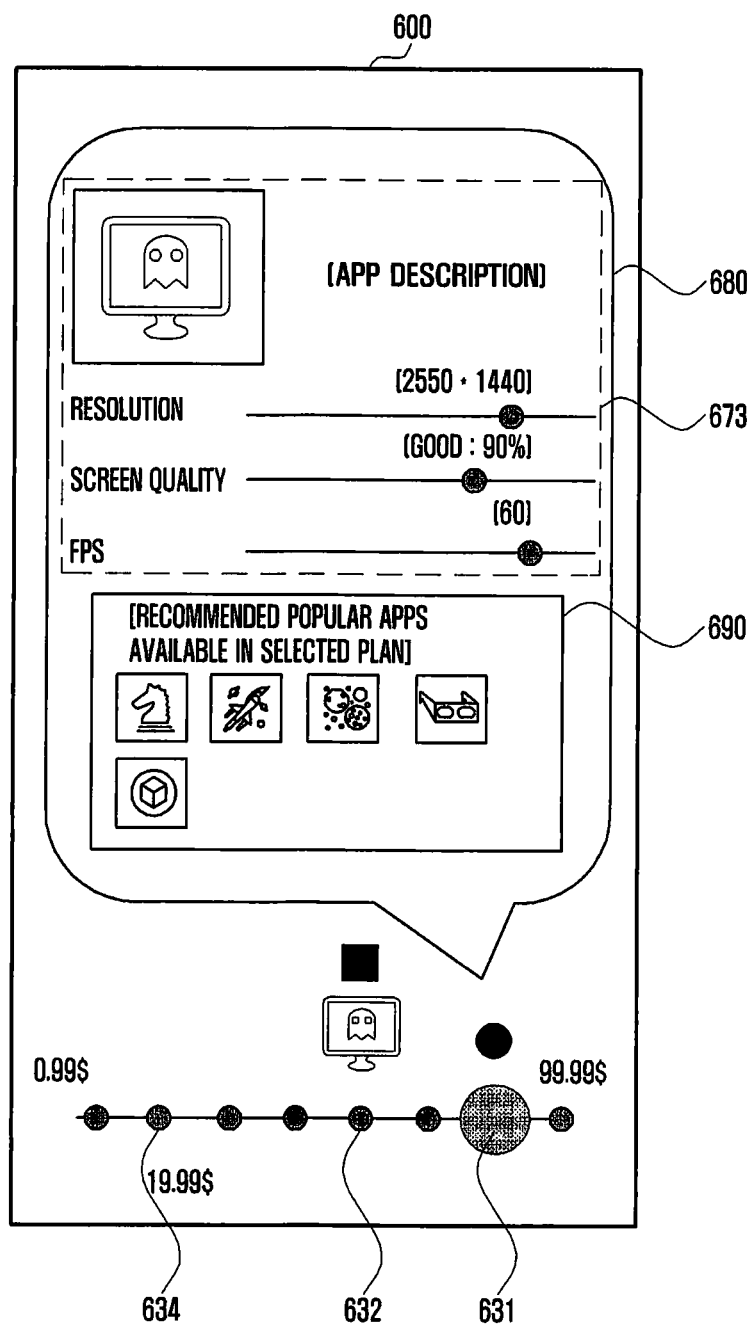
Figure 6C:
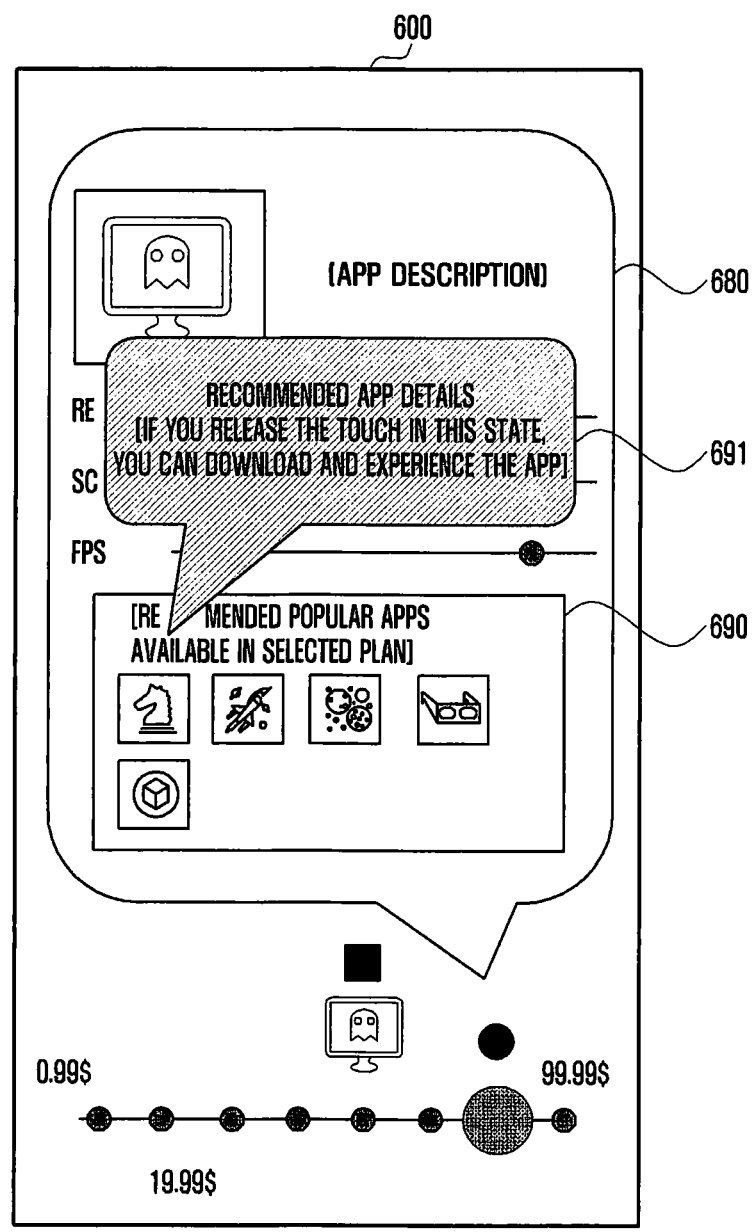

FIGS. 6A, 6B, and 6C illustrate a profile setting interface 600 according to various embodiments of the disclosure, the profile setting interface showing the computing quality of a specific application corresponding to a selected service profile.

According to various embodiments, the processor (e.g., the processor 120 in FIG. 1 or the second processor 333 in FIG. 3) may display, on a display (e.g., the display device 160 in FIG. 1 or the display 331 in FIG. 3), profile setting interface 600 that contains information indicating the computing quality of a specific application corresponding to a selected service profile. For example, referring to FIG. 6A, the processor may display the profile setting interface 600 containing a scroll bar 630 (e.g., the scroll bar 430 in FIG. 4C) on the display. The processor may display a selection button 631 on a first point corresponding to the selected first service profile, and display, at a position adjacent to the selection button 631, first information 640 (e.g., the first information 440 in FIG. 4C) indicating that corresponding packaging fails to meet the recommended specifications of the specific application. The processor may display second information 650 (e.g., the second information 450 in FIG. 4C) at a position adjacent to a second point 632 corresponding to a second service profile that satisfies the recommended specifications. The processor may display third information 660 (e.g., the third information 460 in FIG. 4C) at a position adjacent to a third point 633 corresponding to a third service profile that satisfies the optimum specifications. In response to a user input (e.g., touching the selection button 431), the processor may display first detailed information 671 indicating the computing quality of the specific application corresponding to the first service profile through a pop-up window 680. Through the first detailed information 671, the user can know the types and performances of unavailable computing resources.

According to various embodiments, the processor (e.g., the processor 120 in FIG. 1 or the second processor 333 in FIG. 3) may change a service profile, based on a user input. The processor may change detailed information to be displayed through the pop-up window 680 in accordance with the change of the service profile. For example, referring to FIG. 6B, the processor may move and display the selection button 631 from the first point 634 to the third point 633 in response to a user input (e.g., a touch gesture). The processor may select a corresponding third service profile upon the movement of the selection button 631 to the third point 633. The processor may display third detailed information 673 indicating the computing quality of a specific application corresponding to the selected third service profile through the pop-up window 680. Through the third detailed information 673, the user may know the types and performances of computing resource that can operate comfortably. Although not shown, when the selection button 631 moves to the second point 632, the second service profile is selected, and second detailed information indicating the computing quality of a specific application corresponding to the second service profile may be displayed through the pop-up window 680.

According to various embodiments, the processor (e.g., the processor 120 in FIG. 1 or the second processor 333 in FIG. 3) may recommend an application available with the selected service profile to the user through the pop-up window 680. For example, referring to FIG. 6B, the processor may insert a recommended application list 690 into the pop-up window 680 and display it on the display (e.g., the display 331 in FIG. 3). The recommended application list 690 may indicate an application, selected by the processor, capable of operating to meet a corresponding rank (e.g., the comfortable rank) in the selected third service profile, among applications in the application list received from the remote computing device (e.g., the remote computing device 310 in FIG. 3). Referring to FIG. 6C, the processor may receive a selection (e.g., touch) of a specific application from the recommended application list 690 through the display. The processor may display information related to the selected specific application through a second pop-up window 691. For example, the second pop-up window 691 may contain detailed information of a corresponding application, and also contain an interface for downloading and experiencing the application.

Figure 7:
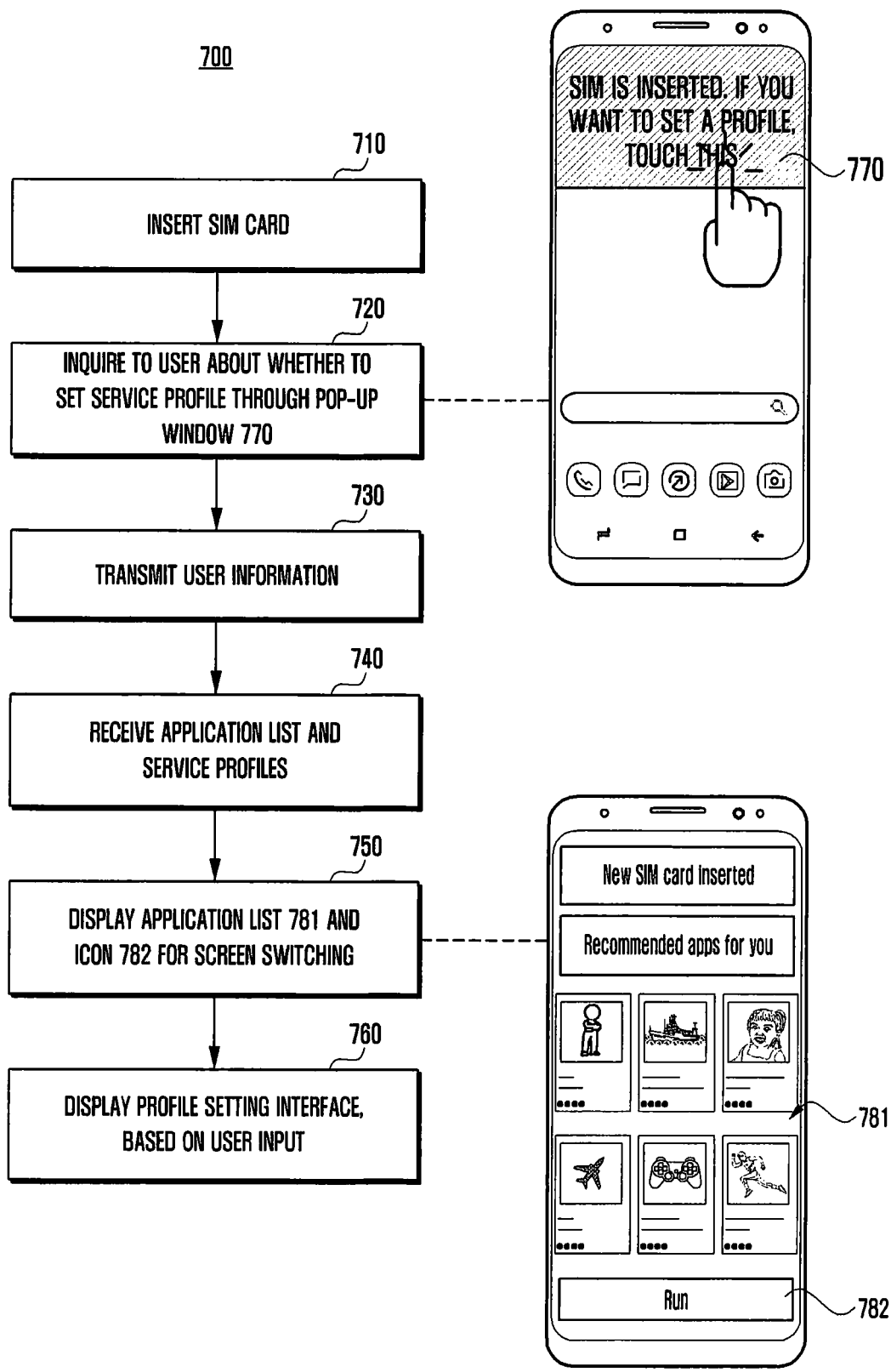
FIG. 7 illustrates operations performed in response to insertion of a SIM card into an electronic device at a user device according to various embodiments of the disclosure.

FIG. 7 illustrates operations 700 performed in response to insertion of a SIM card into an electronic device at a user device according to various embodiments of the disclosure.

Referring to FIG. 7, the operations 700 may be executed by a processor (e.g., the processor 120 in FIG. 1 or the second processor 333 in FIG. 3).

According to various embodiments, at operation 710, the processor may recognize through an interface (e.g., the interface 177 in FIG. 1) that the SIM card (e.g., the subscriber identification module 196 in FIG. 1) is inserted into the electronic device (e.g., the electronic device 101 in FIG. 1).

According to various embodiments, at operation 720, the processor may display a pop-up window 770 on a display to inquire to the user about whether to set a service profile.

According to various embodiments, at operation 730, in response to a user input to the pop-up window 770 (e.g., when the user touches the pop-up window 770), the processor may transmit a request message including user information (e.g., subscriber information stored in the SIM card) to a remote computing device (e.g., the remote computing device 310 in FIG. 3) by using a wireless communication circuit (e.g., the wireless communication module 192 in FIG. 1 or the wireless communication circuit 332 in FIG. 3).

According to various embodiments, at operation 740, the processor may receive an application list and service profiles as a response to the request message from the remote computing device through the wireless communication circuit.

According to various embodiments, at operation 750, the processor may display the received application list 781 and an icon 782 for switching to a profile setting interface on the display.

According to various embodiments, at operation 760, in response to a user input (e.g., when the user touches the icon 782), the processor may display the profile setting interface (e.g., the profile setting interface 400 in FIG. 4, the profile setting interface 500 in FIG. 5, or the profile setting interface 600 in FIG. 6) on the display. The processor may transmit information of a service profile selected through the profile setting interface to the remote computing device through the wireless communication circuit. Based on this, the remote computing device may set the packaging of computing resources defined in the selected service profile as computing resources for supporting a virtual mobile environment (VMI) in the user device. For example, the remote computing device may cause the virtual device to execute a specific application by using the packaging, and may transmit the execution result to the user device.

In some embodiments, displaying the application list 781 may be omitted. For example, the processor may receive an application list and service profiles as a response to the request message from the remote computing device through the wireless communication circuit. The processor may generate a computing quality table (or graph) related to the selected service profile and a scroll bar by using the received information, and may display a profile setting interface including the generated information on the display.

Figure 8:
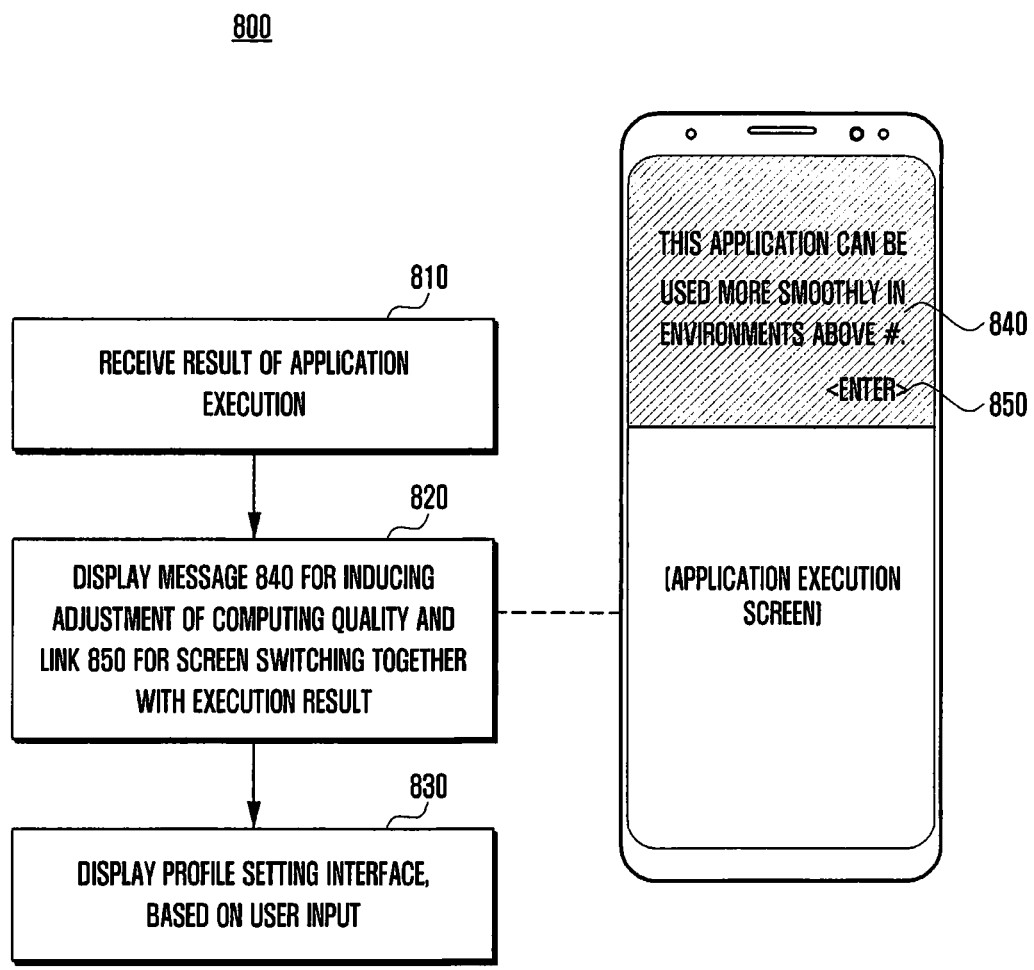
FIG. 8 illustrates operations for inducing adjustment of the computing quality of a specific application, executed at a user device according to various embodiments of the disclosure.

FIG. 8 illustrates operations 800 for inducing adjustment of the computing quality of a specific application, executed at a user device according to various embodiments of the disclosure. Referring to FIG. 8, the operations 800 may be executed by a processor (e.g., the processor 120 in FIG. 1 or the second processor 333 in FIG. 3).

According to various embodiments, at operation 810, the processor may receive the result of a specific application executed based on the selected service profile from a remote computing device (e.g., the remote computing device 310 in FIG. 3) through a wireless communication circuit (e.g., the wireless communication module 192 in FIG. 1 or the wireless communication circuit 332 in FIG. 3).

According to various embodiments, at operation 820, the processor may display, on the display, a message 840 for inducing adjustment of a computing quality (e.g., a message indicating that quality can be increased) and a link 850 for screen switching to a profile setting interface (e.g., text "enter") together with the result.

According to various embodiments, at operation 830, in response to a user input (e.g., when the user touches the link 850), the processor may display the profile setting interface (e.g., the profile setting interface 400 in FIG. 4, the profile setting interface 500 in FIG. 5, or the profile setting interface 600 in FIG. 6) on the display.

Figure 9:
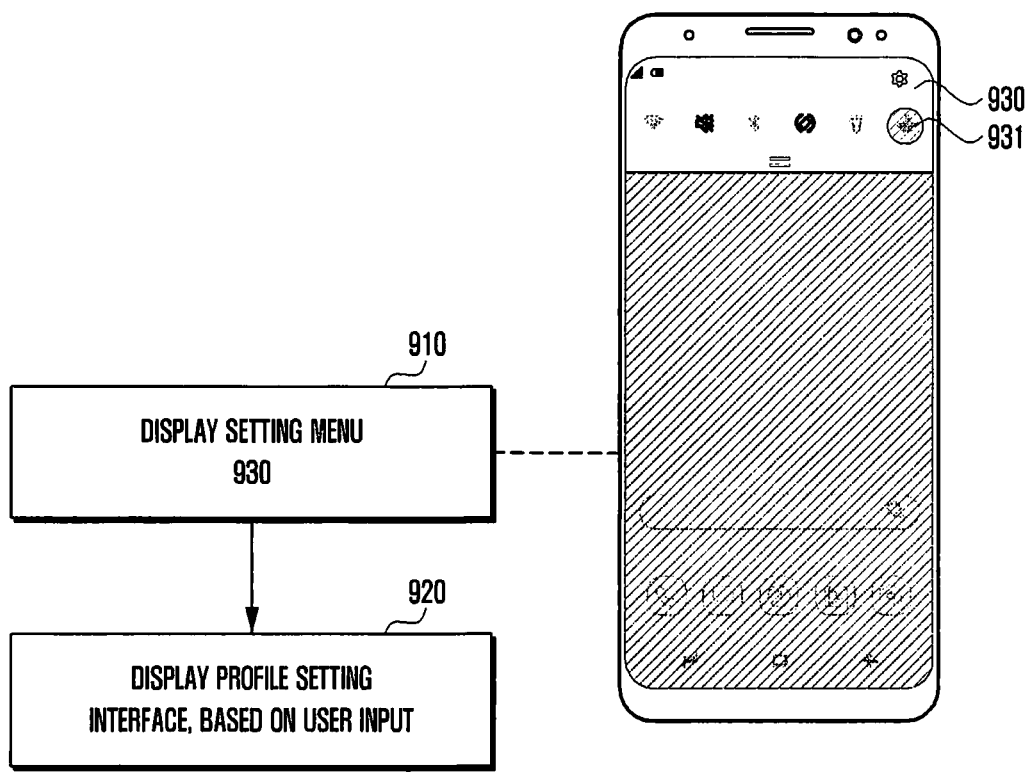
FIG. 9 illustrates operations for entering a profile setting interface through a setting menu, executed at a user device according to various embodiments of the disclosure.

FIG. 9 illustrates operations 900 for entering a profile setting interface through a setting menu, executed at a user device according to various embodiments of the disclosure. Referring to FIG. 9, the operations 900 may be executed by a processor (e.g., the processor 120 in FIG. 1 or the second processor 333 in FIG. 3).

According to various embodiments, at operation 910, in response to a user input (e.g., in response to a touch input drag from the top to the bottom of the display 331), the processor may display a setting menu 930 including an icon 931 for screen switching to a profile setting interface on the display 331 (e.g., the display device 160 in FIG. 1 or the display 331 in FIG. 3).

According to various embodiments, at operation 920, in response to a user input (e.g., when the user touches the icon 931), the processor may display the profile setting interface (e.g., the profile setting interface 400 in FIG. 4, the profile setting interface 500 in FIG. 5, or the profile setting interface 600 in FIG. 6) on the display.

Figure 10:
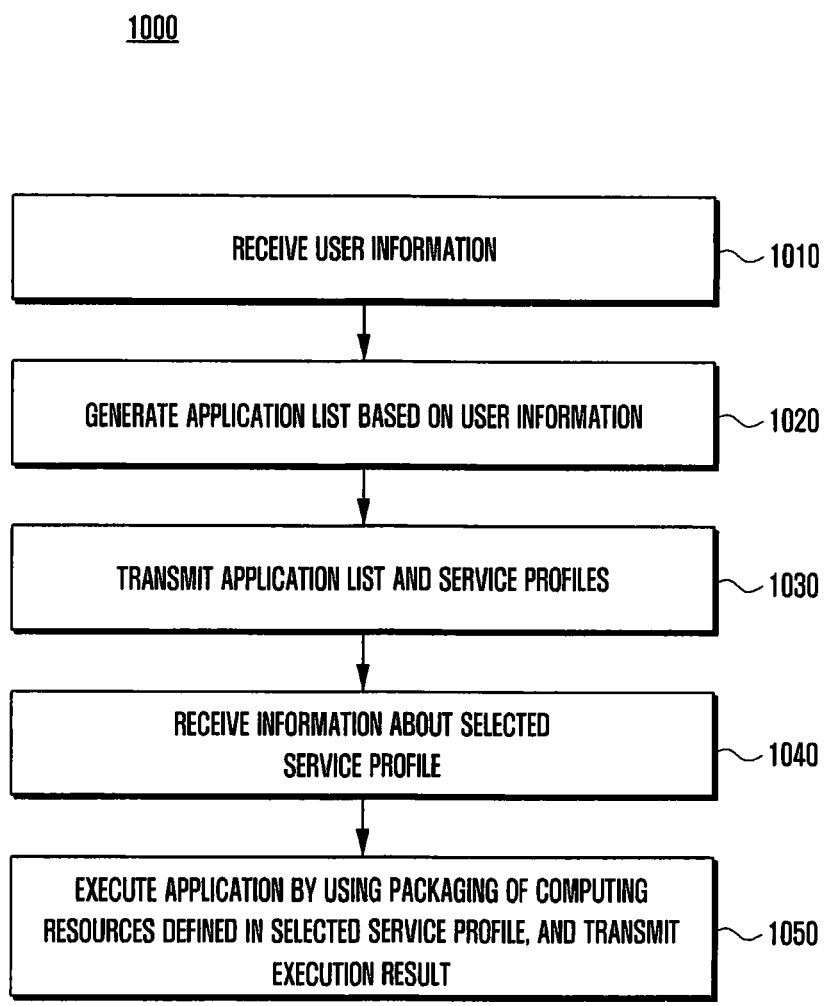
FIG. 10 illustrates operations executed at a remote computing device according to various embodiments of the disclosure.

FIG. 10 illustrates operations 1000 executed at a remote computing device according to various embodiments of the disclosure. Referring to FIG. 10, the operations 1000 may be executed by a processor (e.g., at least one of the plurality of first processors 319 in FIG. 3).

According to various embodiments, at operation 1010, the processor may receive user information (e.g., subscriber information stored in the subscriber identification module 196 in FIG. 1) from a user device (e.g., the electronic device 101 in FIG. 1 or the user device 330 in FIG. 3) through a network (e.g., the second network 199 in FIG. 1 or the network 340 in FIG. 3).

According to various embodiments, at operation 1020, the processor may generate an application list based on the received user information.

According to various embodiments, at operation 1030, the processor may transmit service profiles and the application list to the user device. Each service profile may include information indicating the types of available, upon selected, computing resources and the performance of each computing resource. Additionally, each service profile may include price information set for packaging of computer resources defined in the corresponding service profile. At least one service profile may be generated, for example, before the execution of the operations 1000 and stored in a storage device (e.g., the storage device 320 in FIG. 3). In some embodiments, the at least one service profile may be previously transmitted by the processor to the user device through the network before the operation 1010 is executed.

According to various embodiments, at operation 1040, the processor may receive information about a service profile selected by the user (e.g., identification information of the selected service profile in case where identification information is assigned to each of service profiles) from the user device through the network.

According to various embodiments, at operation 1050, the processor may cause a virtual device (e.g., one of the virtual devices 318 in FIG. 3) to execute an application by using packaging of computing resources defined in the selected service profile, and may transmit the result executed by the virtual device to the user device through the network.

In various embodiments, the processor may generate a computing resource specification table, based on a statistically collected hardware service quality (e.g., runtime and/or network service quality (e.g., latency)) for each application in the application list. For example, the computing resource specification table may include a recommended specification table and/or an optimum specification table for each application. The recommended specification table may include information indicating the types of computing resources and the performance of each computing resource required as recommended specifications. The optimum specification table may include information indicating the types of computing resources and the performance of each computing resource required for optimum specifications. For example, the computing resource specification table may be generated before the execution of the operations 1000 and stored in the storage device (e.g., the storage device 320 in FIG. 3). The computing resource specification table may be transmitted to the user device together with service profiles and the application list.

In various embodiments, the processor may receive a user's selection for a specific service profile from the user device through the network, and may classify applications into, for example, three ranks (unsupported, supportable, and comfortable), based on the selected service profile. The processor may transmit information about an application operation level (e.g., the aforesaid three ranks) determined based on the selected service profile to the user device through the network. For example, instead of the generated computing resource specification table, the processor may transmit information about the application operation level (e.g., the aforesaid three ranks) to the user device through the network.

An electronic device (e.g., the electronic device 101 in FIG. 1 or the user device 330 in FIG. 3) according to various embodiments includes a touch-sensitive display (e.g., the display device 160 in FIG. 1 or the display 331 in FIG. 3); a wireless communication circuit (e.g., the wireless communication module 192 in FIG. 1 or the wireless communication circuit 332 in FIG. 3) configured to transmit/receive a radio signal in accordance with 3GPP standard; a processor (e.g., the processor 120 in FIG. 1 or the second processor 333 in FIG. 3) operatively connected to the wireless communication circuit and the display; and a memory (e.g., the memory 130 in FIG. 1 or the memory 334 in FIG. 3) operatively connected to the processor. The memory may store instructions that, when executed, cause the processor to transmit user information to a remote computing device outside the electronic device by using the wireless communication circuit, to receive service profiles differently defining types and/or performances of computing resources used when executing an application, and an application list based on the user information, from the remote computing device through the wireless communication circuit, to generate a graphic user interface configured to allow a user to select one of the service profiles, display the types and performances of the computing resources defined in the selected service profile, and display information about a computing quality exhibited when each application in the application list is executed using packaging of the computing resources defined in the selected service profile, to display the graphic user interface through the display, to receive selection of a service profile from the user through the graphic user interface displayed on the display, and to transmit information about the service profile selected through the graphic user interface to the remote computing device through the wireless communication circuit.

According to various embodiments, the instructions may cause the processor to insert, into the graphic user interface displayed through the display, a scroll bar configured to allow the user to select one of the service profiles. The instructions may cause the processor to display a selection button at a first point of the scroll bar, to insert, into the graphic user interface displayed on the display, first packaging of computing resources defined in a first service profile corresponding to the first point, and first information about a computing quality exhibited when executing using the first packaging, to move the displayed selection button from the first point to a second point in response to a user input, and to insert, into the graphic user interface displayed on the display, instead of the first packaging and the first information, second packaging of computing resources defined in a second service profile corresponding to the second point, and second information about a computing quality exhibited when executing using the second packaging.

According to various embodiments, the information may include, as a computing quality exhibited when executing using the packaging, first information indicating an application corresponding to an unsupported rank, second information indicating an application corresponding to a supportable rank, and third information indicating an application that exhibits higher performance computer quality than the supportable rank. The first information, the second information, and the third information may be displayed in a table or graph form. The instructions may cause the processor to display a message for inducing a rank upgrade on the display when an application to be executed using the packaging by the remote computing device corresponds to the unsupported rank.

According to various embodiments, the packaging may include a processor and/or a memory as a hardware resource used when the remote computing device executes an application. The packaging may further include at least one of a type of the network, an amount of data allowing the electronic device to upload and/or download, or a network service quality, as a network resource used when the electronic device communicates with a network by using the wireless communication circuit.

According to various embodiments, the instructions may cause the processor to, based on an insertion of a SIM card into the electronic device, transmit subscriber information stored in the SIM card as the user information to the remote computing device.

According to various embodiments, the instructions may cause the processor to receive a computing resource specification table that defines types and performances of computing resources required when executing each application in the application list, to, based on the computing resource specification table, classify applications in the application list into various ranks according to a computing quality exhibited when executing using the packaging, and to insert information indicating the rank of each of the applications into the graphic user interface displayed through the display.

According to various embodiments, the remote computing device may classify applications in the application list into various ranks according to a computing quality exhibited when executing the applications by using the packaging, and the instructions may cause the processor to receive information indicating the rank of each of the applications from the remote computing device through the wireless communication circuit, and to insert the received information into the graphic user interface displayed through the display.

An electronic device (e.g., the remote computing device 310 in FIG. 3) according to various embodiments includes a wired interface (e.g., the wired interface 321 in FIG. 3) connected to a network; a plurality of processors (e.g., the first processors 319 in FIG. 3) operatively connected to the network through the wired interface; and a storage device (e.g., the storage device 320 in FIG. 3) operatively connected to the processors and storing at least one virtual device. The storage device may store instructions that, when executed, cause at least one of the processors to receive user information from a user device outside the electronic device through the wired interface, to generate an application list based on the user information, to transmit the application list and service profiles differently defining types and/or performances of computing resources used when executing an application to the user device through the wired interface, to receive information about a service profile selected from among the service profiles from the user device through the wired interface, to cause the virtual device to execute an application by using packaging of computing resources defined in the selected service profile, and to transmit a result of execution of the application to the user device through the wired interface.

According to various embodiments, the packaging may include at least one of the processors and/or a memory as a hardware resource used when the virtual device executes an application. The packaging may further include at least one of a type of the network, an amount of data allowing the user device to upload and/or download, or a network service quality, as a network resource used when the user device communicates with a network by using the wireless communication circuit.

According to various embodiments, the instructions may cause the at least one of the processors to classify applications in the application list into various ranks according to a computing quality exhibited when executing by using the packaging, and to transmit information indicating the rank of each of the applications to the user device through the wired interface. The information may include, as a computing quality exhibited when executing using the packaging, first information indicating an application corresponding to an unsupported rank, second information indicating an application corresponding to a supportable rank, and third information indicating an application that exhibits higher performance computer quality than the supportable rank.

According to various embodiments, the instructions may cause the at least one of the processors to transmit a computing resource specification table that defines types and performances of computing resources required when executing each application in the application list to the user device through the wired interface.

According to various embodiments, the instructions may cause the at least one of the processors to receive a user input from the user device through the wired interface, to change components of the packaging, based on the user input, and to change a usage fee for the changed packaging.

A method for operating an electronic device according to various embodiments may include transmitting user information to a remote computing device outside the electronic device by using a wireless communication circuit of the electronic device; receiving service profiles differently defining types and/or performances of computing resources used when executing an application, and an application list based on the user information, from the remote computing device through the wireless communication circuit; generating a graphic user interface configured to allow a user to select one of the service profiles, display the types and performances of the computing resources defined in the selected service profile, and display information about a computing quality exhibited when each application in the application list is executed using packaging of the computing resources defined in the selected service profile; displaying the graphic user interface through a touch-sensitive display of the electronic device; receiving selection of a service profile from the user through the graphic user interface displayed on the display; and transmitting information about the service profile selected through the graphic user interface to the remote computing device through the wireless communication circuit.

A method for operating an electronic device according to various embodiments may include receiving user information from a user device outside the electronic device through a wired interface of the electronic device; generating an application list based on the user information; transmitting the application list and service profiles differently defining types and/or performances of computing resources used when executing an application to the user device through the wired interface; receiving information about a service profile selected from among the service profiles from the user device through the wired interface; causing a virtual device of the electronic device to execute an application by using packaging of computing resources defined in the selected service profile; and transmitting a result of execution of the application to the user device through the wired interface.

The embodiments of the present disclosure and the accompanying drawings are only examples in order to easily describe the present disclosure and facilitate comprehension of the present disclosure, but are not intended to limit the scope of the present disclosure. Therefore, in addition to the embodiments disclosed herein, the scope of the present disclosure should be construed to include all modifications or modified forms drawn based on the present disclosure and is defined by the appended claims and their equivalents.

The invention claimed is:

1. An electronic device comprising:
a touch-sensitive display;
a wireless communication circuit configured to transmit/receive a radio signal;
a processor operatively connected to the wireless communication circuit and the display; and
a memory operatively connected to the processor,
wherein the memory stores instructions that, when executed, cause the processor to:
transmit user information to a remote computing device outside the electronic device by using the wireless communication circuit,
receive service profiles that differently define types and/or performances of computing resources used when executing an application, and an application list based on the user information, from the remote computing device through the wireless communication circuit,
generate a graphic user interface configured to allow a user to select one of the service profiles, display the types and performances of the computing resources defined in the selected service profile, and display information about a computing quality exhibited when each application in the application list is executed using packaging of the computing resources defined in the selected service profile,
display the graphic user interface through the display,
receive selection of a service profile from the user through the graphic user interface displayed on the display, and
transmit information about the service profile selected through the graphic user interface to the remote computing device through the wireless communication circuit,
wherein the information includes, as a computing quality exhibited when executing using the packaging,
first information indicating an application corresponding to an unsupported rank,
second information indicating an application corresponding to a supportable rank, and
third information indicating an application that exhibits higher performance computer quality than the supportable rank.

2. The electronic device of claim 1, wherein the instructions cause the processor to:
insert, into the graphic user interface displayed through the display, a scroll bar configured to allow the user to select one of the service profiles.

3. The electronic device of claim 2, wherein the instructions cause the processor to:
display a selection button at a first point of the scroll bar,
insert, into the graphic user interface displayed on the display, first packaging of computing resources defined in a first service profile corresponding to the first point, and first information about a computing quality exhibited upon execution using the first packaging,
move the displayed selection button from the first point to a second point in response to a user input, and
insert, into the graphic user interface displayed on the display, instead of the first packaging and the first information, second packaging of computing resources defined in a second service profile corresponding to the second point, and second information about a computing quality exhibited upon execution using the second packaging.

4. The electronic device of claim 1, wherein the first information, the second information, and the third information are displayed in a table or graph form.

5. The electronic device of claim 1, wherein the instructions cause the processor to:
display a message for inducing a rank upgrade on the display when an application to be executed using the packaging by the remote computing device corresponds to the unsupported rank.

6. The electronic device of claim 1, wherein the packaging includes a processor and/or a memory as a hardware resource used when the remote computing device executes an application.

7. The electronic device of claim 6, wherein the packaging further includes at least one of a type of the network, an amount of data allowing the electronic device to upload and/or download, or a network service quality, as a network resource used when the electronic device communicates with a network by using the wireless communication circuit.

8. The electronic device of claim 1, wherein the instructions cause the processor to:
   based on an insertion of a SIM card into the electronic device, transmit subscriber information stored in the SIM card as the user information to the remote computing device.

9. The electronic device of claim 1, wherein the instructions cause the processor to:
   receive a computing resource specification table that defines types and performances of computing resources required when executing each application in the application list,
   based on the computing resource specification table, classify applications in the application list into various ranks according to a computing quality exhibited when executing using the packaging, and
   insert information indicating the rank of each of the applications into the graphic user interface displayed through the display.

10. The electronic device of claim 1, wherein the remote computing device classifies applications in the application list into various ranks according to a computing quality exhibited when executing the applications by using the packaging, and
   wherein the instructions cause the processor to:
   receive information indicating the rank of each of the applications from the remote computing device through the wireless communication circuit, and
   insert the received information into the graphic user interface displayed through the display.

* * * * *